(12) United States Patent
Bowring et al.

(10) Patent No.: US 9,746,552 B2
(45) Date of Patent: Aug. 29, 2017

(54) REMOTE DETECTION AND MEASUREMENT OF OBJECTS

(71) Applicant: Radio Physics Solutions Ltd., Herefordshire (GB)

(72) Inventors: Nicholas Bowring, Herefordshire (GB); David Andrews, Herefordshire (GB); Nacer Ddine Rezgui, Herefordshire (GB); Stuart Harmer, Herefordshire (GB)

(73) Assignee: Radio Physics Solutions Ltd., Ledbury, Herefordshire (GB)

( * ) Notice: Subject to any disclaimer, the term of this patent is extended or adjusted under 35 U.S.C. 154(b) by 0 days.

(21) Appl. No.: 14/873,807

(22) Filed: Oct. 2, 2015

(65) Prior Publication Data

US 2016/0097852 A1 Apr. 7, 2016

Related U.S. Application Data

(63) Continuation of application No. 12/519,903, filed as application No. PCT/GB2009/000752 on Mar. 18, (Continued)

(30) Foreign Application Priority Data

Mar. 18, 2008 (GB) .................................. 0804944.7

(51) Int. Cl.
*G01S 13/88* (2006.01)
*G01S 7/41* (2006.01)
(Continued)

(52) U.S. Cl.
CPC ............ *G01S 13/887* (2013.01); *G01S 7/024* (2013.01); *G01S 7/411* (2013.01); *G01S 7/417* (2013.01); *G01S 13/04* (2013.01); *G01S 13/08* (2013.01)

(58) Field of Classification Search
CPC ........ G01S 13/887; G01S 13/32; G06F 19/24; G06F 17/30525; G01R 31/2834
See application file for complete search history.

(56) References Cited

U.S. PATENT DOCUMENTS

| 5,073,782 A | 12/1991 | Huguenin et al. |
| 5,264,856 A | 11/1993 | Thurlow |
| (Continued) | | |

FOREIGN PATENT DOCUMENTS

| EP | 1203359 A2 | 5/2002 |
| EP | 1891459 A2 | 2/2008 |
| (Continued) | | |

OTHER PUBLICATIONS

International Search Report of PCT/GB2009/000752, mailing date Nov. 24, 2001, 5 pages.

(Continued)

*Primary Examiner* — David Porta
*Assistant Examiner* — Faye Boosalis
(74) *Attorney, Agent, or Firm* — Reza Mollaaghababa; Thomas Engellenner; Pepper Hamilton LLP

(57) ABSTRACT

Provided are methods of using electromagnetic waves for detecting metal and/or dielectric objects. Methods include directing microwave and/or mm wave radiation in a predetermined direction using a transmission apparatus, including a transmission element; receiving radiation from an entity resulting from the transmitted radiation using a detection apparatus; and generating one or more detection signals in the frequency domain using the detection apparatus. Methods may include operating a controller, wherein operating the controller includes causing the transmitted radiation to be swept over a predetermined range of frequencies, performing a transform operation on the detection signal(s) to generate one or more transformed signals in the time (Continued)

domain, and determining, from one or more features of the transformed signal, one or more dimensions of a metallic or dielectric object upon which the transmitted radiation is incident. A system and method for remote detection and/or identification of a metallic threat object using late time response (LTR) signals is also disclosed.

24 Claims, 18 Drawing Sheets

Related U.S. Application Data 2009, now Pat. No. 9,182,481, which is a continuation-in-part of application No. 12/050,524, filed on Mar. 18, 2008, now Pat. No. 8,103,604.

(51) Int. Cl.
G01S 13/04 (2006.01)
G01S 7/02 (2006.01)
G01S 13/08 (2006.01)

(56) References Cited

U.S. PATENT DOCUMENTS

| | | |
|---|---|---|
| 5,337,058 A | 8/1994 | Cross |
| 5,486,833 A | 1/1996 | Barrett et al. |
| 5,704,355 A | 1/1998 | Bridges |
| 5,807,257 A | 9/1998 | Bridges |
| 6,061,589 A | 5/2000 | Bridges et al. |
| 6,243,036 B1 | 6/2001 | Chadwick et al. |
| 6,421,550 B1 | 7/2002 | Bridges et al. |
| 6,777,684 B1 | 8/2004 | Volkov et al. |
| 6,856,271 B1 | 2/2005 | Hausner |
| 6,967,612 B1 | 11/2005 | Gorman et al. |
| 7,167,123 B2 | 1/2007 | Hausner et al. |
| 7,246,522 B1 | 7/2007 | Diaz et al. |
| 7,304,603 B2 | 12/2007 | Reed et al. |
| 7,492,303 B1 | 2/2009 | Levitan et al. |
| 7,800,527 B2 | 9/2010 | Douglass et al. |
| 2002/0130804 A1 | 9/2002 | McMakin et al. |
| 2005/0230604 A1 | 10/2005 | Rowe et al. |
| 2006/0066469 A1 | 3/2006 | Foote et al. |
| 2007/0052576 A1 | 3/2007 | Hausner et al. |
| 2007/0102629 A1* | 5/2007 | Richard .................. G01S 7/024 250/225 |
| 2007/0132630 A1 | 6/2007 | Beckner |
| 2008/0174476 A1 | 7/2008 | Detlefsen et al. |
| 2010/0265117 A1 | 10/2010 | Weiss |

FOREIGN PATENT DOCUMENTS

| | | |
|---|---|---|
| GB | 869770 | 6/1961 |
| GB | 2299214 | 9/1996 |
| GB | 2435509 | 8/2007 |
| JP | 2008275382 | 11/2008 |
| RU | 2187129 C1 | 8/2002 |
| WO | 9007130 A1 | 6/1990 |
| WO | 0075892 A2 | 12/2000 |
| WO | 0217231 A2 | 2/2002 |
| WO | 2006001821 | 1/2006 |
| WO | 2006021799 A1 | 3/2006 |
| WO | 2006137883 A2 | 12/2006 |
| WO | 2007086916 A2 | 8/2007 |
| WO | 2007130288 A2 | 11/2007 |
| WO | 2007148327 A2 | 12/2007 |
| WO | 2009062946 A1 | 5/2009 |
| WO | 2009115818 A3 | 9/2009 |

OTHER PUBLICATIONS

United Kingdom Search Report of GB0904640.0, date of Search Report Jan. 5, 2010, 2 pages.
United Kingdom Search Report of GB1020664.7, date of Search Report Feb. 23, 2011.
United Kingdom Search and Examination Report GB0804944.7, dated Jun. 27, 2008, 6 pages.
United Kingdom Search and Examination Report of GB09046460.0 date Jul. 9, 2009, 10 pages.
Zhang et al., "Preliminary Investigation of Breast Tumor Detection Using Cross-Vivaldi Antenna," Proceedings of the 2005 IEEE, Engineering in Medicine and Biology 27th Annual Conference, Shanghai,m China, pp. 6691-6694.

* cited by examiner

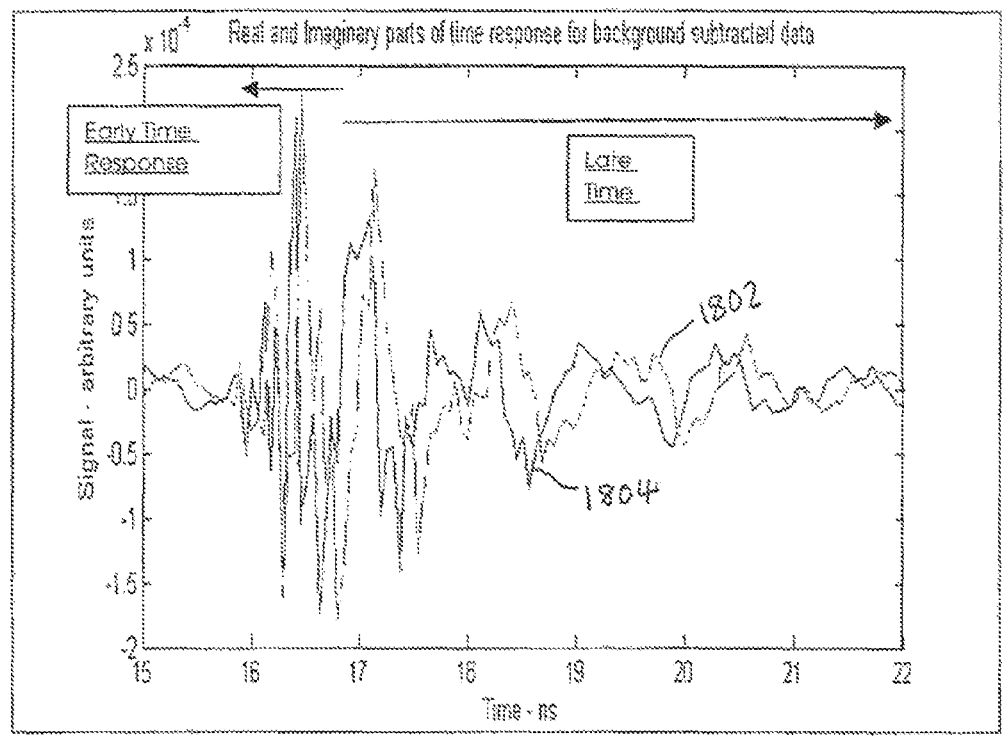
Fig. 18(a)
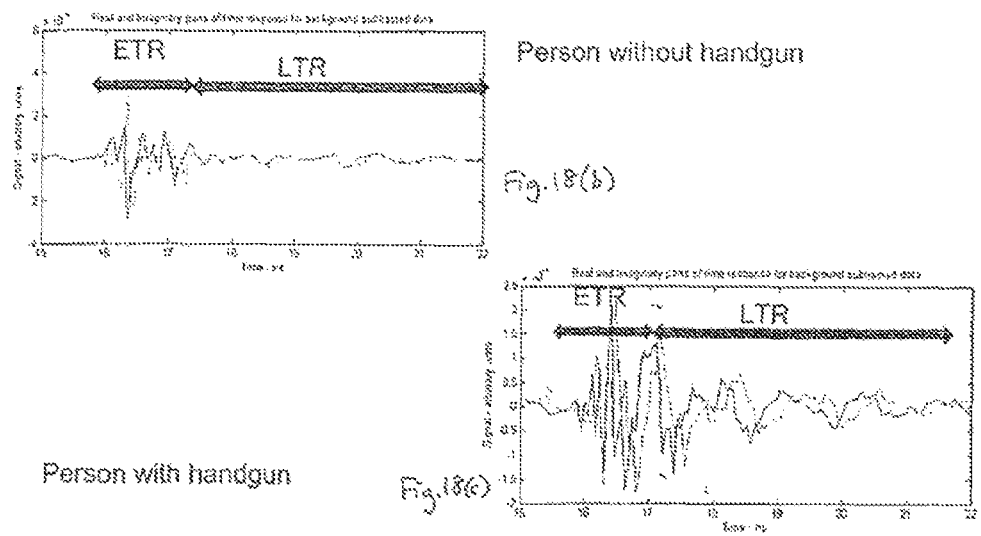
Person without handgun
Fig. 18(b)
Person with handgun
Fig. 18(c)

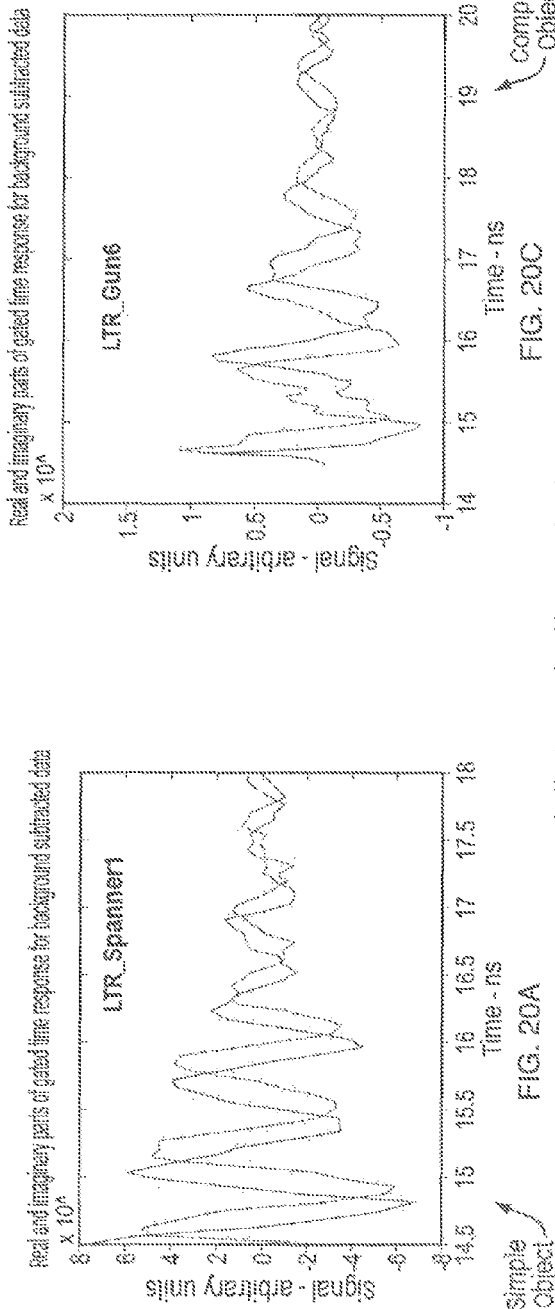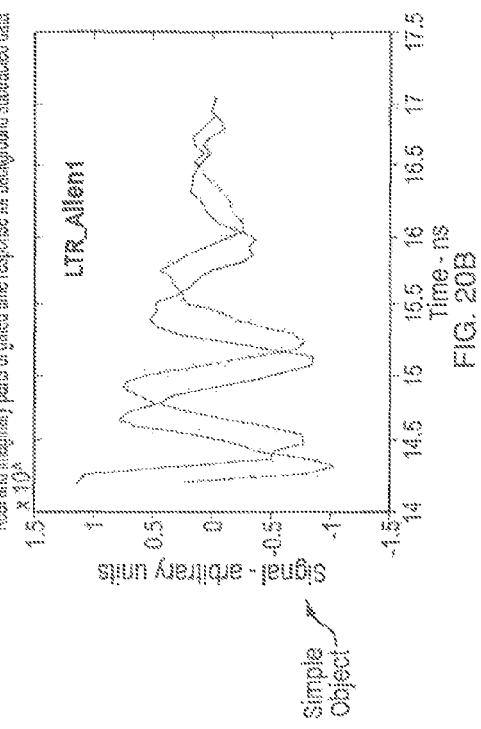
FIG. 20A  FIG. 20B  FIG. 20C

REMOTE DETECTION AND MEASUREMENT OF OBJECTS

CROSS-REFERENCE TO RELATED APPLICATIONS

The present application is a continuation of U.S. patent application Ser. No. 12/519,903, filed Feb. 10, 2011, which is a U.S. National Application based on PCT/GB2009/000752, filed Mar. 18, 2009, which claims priority to U.S. patent application Ser. No. 12/050,524, filed Mar. 18, 2008, U.S. Pat. No. 8,103,604, Issued Jan. 24, 2012 and GB Patent Application 0804944.7, filed Mar. 18, 2008. Each of these applications is herein incorporated by reference in its entirety.

TECHNICAL FIELD

The present invention relates to the detection of objects, and more particularly to techniques for remote detection and measurement of objects.

BACKGROUND ART

It is well known to use electromagnetic radiation to detect the presence of objects (e.g. handheld detectors used for detecting objects on or under the ground, and walk-through arches at airports).

However, the conventional detectors used at airports may be unable to determine the dimensions of objects to any significant degree, and thus may be unable to distinguish between objects of different types, i.e. harmless (belt buckles, cameras), and potentially dangerous (guns knives).

The detection of concealed weapons, especially handguns, may be a very great problem for security applications that currently cannot be policed without a non-portable system, for example random cheeks in an urban environment. The use of microwaves (electromagnetic waves with wavelengths in the centimeter to millimeter range) may provide a means for the standoff detection and identification of concealed conducting items such as handguns and knives. Large metal objects, such as handguns, may give a significantly different and generally larger response when irradiated by low power microwaves than that from the human body, clothing and/or benign normally-carried objects. The larger response may be detected using a combination of antenna and sensitive receiver.

By actively illuminating au object with wide-range swept and/or stepped frequency microwave and/or millimeter wave radiation, the frequency response of the return signal may give the range and/or information regarding dimensions of the object. This method may be substantially equivalent to using a fast microwave pulse and measuring the response as function of time, as used in conventional RADAR. Selecting a part of the return signal within a particular range may aid the positive identification of the suspect object and may also help to reject background signals. The analysis of the time response may give further information as to the dimensions of the target. This technique may also be applied to the detection of dielectric layers, such as, for example, an explosive vest strapped to a suicide bomber (see *Active millimeter wave detection of concealed layers of dielectric material*, Bowring N. J., Baker J. G., Rezgui N., Southgate M., Proceedings of the SPIE 6540-52 2007; and *A sensor for the detection and measurement of thin dielectric layers using reflection of frequency scanned millimetric waves* Bowring N. J., Baker J. G., Rezgui N., Alder J. F., *Meas. Sci. Technol.* 19 024004 (7 pp) 2008). However, such techniques have not been heretofore used for detecting and measuring metal objects.

A system based on swept frequency RADAR has been proposed (U.S. Pat. Nos. 6,359,582 and 6,856,271 and published application US2007/0052576). In the disclosed systems, the frequency may be swept by typically by 1 GHz around about 6 GHz. The depth resolution that is achievable is therefore only 15 cm, thus the system may not give details of the objects. The detection relies on comparing gross features of the signal as a whole with similar suspicious and benign signals to which the system had been previously exposed. Also the measurement of polarization properties of the scattered signal may be used.

In the aforementioned patent documents, the low frequency of operation makes the angular resolution of the antennae poor and the wide field of view makes it difficult to single out particular targets and/or to determine on which part of the target the threat is situated. This may be improved by changing to higher frequencies where microwave optics becomes effective. This may be particularly important for explosives detection where the contrast from the body signal is low. Systems working at higher frequencies but still with a limited bandwidth have been proposed by Gorman et al (U.S. Pat. No. 6,967,612) and by Millitech (U.S. Pat. No. 5,227,800). Many systems have been produced to enable images of the target to be obtained using, either active microwave illumination or the passive thermal emission of the target (SPIE 2007). These systems use multi-detector arrays and some form of mechanical scanning. Passive systems, though giving more realistic images, tend to be slow and show poor contrast for dielectric targets. Active illumination systems can be acquired faster, but may suffer from strong reflections from benign objects such as the human body, which make it difficult to distinguish from metal threat objects. All scanning systems may require complex human or Artificial Intelligence interaction to interpret the image and/or to pick out the suspect features. This makes their deployment in many applications difficult.

It is apparent that systems which can identify threat objects at stand-off distances may have many applications, where conventional metal detector booths are inappropriate. These may include covert surveillance and mobile operation in streets and buildings. Portable, compact and cost-effective systems are not presently available and this invention seeks to address this need.

SUMMARY OF THE INVENTION

According to some embodiments of the present invention there are provided systems for remote detection of one or more dimensions of a metallic or dielectric object. Some embodiments of such systems may include a transmission apparatus, including a transmission element, for directing microwave and/or mm wave radiation in a predetermined direction, a detection apparatus, for receiving radiation from an entity resulting from the transmitted radiation sod generating one or more detection signals in the frequency domain, and a controller. In some embodiments, the controller may be operable to (i) cause the transmitted radiation to be swept over a predetermined range of frequencies, (ii) perform a transform operation on the detection signal(s) to generate one or more transformed signals in the time domain or optical depth domain, and (iii) determine, from one or more features of the transformed signal, one or more dimensions of a metallic or dielectric object upon which the transmitted radiation is incident.

In some embodiments, the transmission element is a directional element that may be pointed by a user.

In some embodiments, the controller is operable to initiate step (i) upon receiving an activation signal, the activation signal corresponding to a user input and/or to detection of the presence of the entity.

In some embodiments, step (i) comprises stepwise sweeping by predetermined steps in frequency and step (ii) comprises (iia) performing a transform operation-after each sweep to produce a time domain or optical depth domain trace, and (iib) storing each time domain trace in a respective sweep channel, said time domain or optical depth domain traces thereby comprising said transformed signals.

In some embodiments, step (iii) comprises normalising said according to range one or more transformed signals.

In some embodiments, step (iii) further comprises using a Complex Fourier Transform and/or Direct Fourier Transform to convert transformed signals to the x-dimension, and determining the x-positions of peaks on the transformed signals.

In some embodiments, step (iii) further comprises, from the x-positions, using $$L = \frac{c}{2\Delta f}$$

where L=optical depth
c=the speed of light
$\Delta f$=the periodicity in the frequency domain,
to determine corrected x-axis positions, and thereby optical depth.

In some embodiments, step (ii) includes the procedure of Appendix B.1, thereby producing first and second outputs (Output1, Output2) dependent upon the detection signals, wherein Output1 is the sum of all correlations between vectors in a first array, the vectors in the first array comprising, for each sweep channel, a stored signal above a threshold that are derived by Direct Fourier Transform from the detection signals, and Output2 is the sum of integrated signals above the threshold for each sweep channel.

In some embodiments, atop (ii) includes the procedure of Appendix B.2, thereby producing a third output (Output3) dependent upon the detection signals, wherein Output3 is, for each sweep channel, the best (lowest) correlation value between the ideal response for a number of barrel lengths and for a number of weapon calibers stored in memory and the direct untransformed detection signals $|E_R|^2$.

In some embodiments, the detection apparatus includes a first detection element directed in a first direction, towards the entity, for generating non-polarized detection signals, and a second detection element, directed at 90 degrees to the first element, for generating cross-polarized detection signals, and wherein step (ii) includes the procedure of Appendix B.3, thereby producing fourth and fifth outputs (Output4, Output5) dependent upon the detection signals, wherein Output4 is, for each sweep channel, the sum of correlations between the transformed signals, the transformed signals comprising a Complex Fourier Transform of the non-polarized detection signals and of the cross-polarized detection signals, and Output5, for each sweep channel, the sum of the integrated non-polarized and cross-polarized signals after Complex Fourier Transform. In some embodiments, the integrated non-polarized and cross-polarized signals comprise integrations of transformed signals within one or more distance windows, the contents of each distance window being stored in a database in association with a respective response for a particular weapon.

In some embodiments, step (ii) includes the procedure of Appendix B.4, thereby producing sixth and seventh outputs (Output6, Output7) dependent upon the detection signals.

In some embodiments, the system further includes a neural network, the neural network having as inputs thereto any combination of (a) the first and second outputs (Output1, Output2), (b) the third output (Output3), (c) the fourth and fifth outputs (Output4, Output5), and (d) the sixth and seventh outputs (Output6, Output7), wherein the output of site neural network is an indication of a confidence level of a metallic or dielectric object of a predetermined type being detected, for example, 1=gun detected, 0=no metallic or dielectric object detected.

According to some embodiments of the present invention there are provided methods for remote detection of one or more dimensions of a metallic or dielectric object. Such methods may include a transmission apparatus, including a transmission element, for directing microwave and/or mm wave radiation in a predetermined direction, a detection apparatus, for receiving radiation from an entity resulting from the transmitted radiation and generating one or more detection signals in the frequency domain, and a controller. Methods may include operating the controller to (i) cause the transmitted radiation to be swept over a predetermined range of frequencies, (ii) perform a transform operation on the detection signal(s) to generate one or more transformed signals in the time domain, and (iii) determine, from one or more features of the transformed signal, one or snore dimensions of a metallic or dielectric object upon which the transmitted radiation is incident. In some embodiments, the transmission element is a directional element that may be pointed by a user.

In some embodiments, the controller is operable to initiate step (i) upon receiving an activation signal, the activation signal corresponding to a user input or to detection of the presence of the entity.

In some embodiments, step (i) comprises stepwise sweeping by predetermined steps in frequency and step (ii) comprises (iia) perform a transform operation after each sweep to produce a time domain or depth domain trace, and (iib) storing each time domain or depth domain trace in a respective sweep channel, said time domain or depth domain traces thereby comprising said transformed signals.

In some embodiments, step (iii) comprises normalising according to range one or more transformed signals.

In some embodiments, step (iii) further comprises using a Complex Fourier Transform and/or Direct Fourier Transform to convert transformed signals to the x-dimension, and determining the x-positions of peaks on the transformed signals.

In some embodiments, step (iii) further comprises, from the x-positions, using $$L = \frac{c}{2\Delta f}$$

where L=distance to entity
c=the speed of light
$\Delta f$=the periodicity in the frequency domain,
to determine corrected x-axis positions, and thereby optical depth.

In some embodiments, step (ii) includes the procedure of Appendix B.1, thereby producing first and second outputs (Output1, Output2) dependent upon the detection signals, wherein Output1 is the sum of all correlations between vectors in a first array, the vectors in the first array comprising, for each sweep channel, a stored signal above a threshold that are derived by Direct Fourier Transform from the detection signals, and Output2 is the sun of integrated signals above the threshold for each sweep channel.

In some embodiments, step (ii) includes the procedure of Appendix B.2, thereby producing a third output (Output3) dependent upon the detection signals, wherein Output3 is, for each sweep channel, the best (lowest) correlation value between the ideal response for a number of barrel lengths and for a number of weapon calibers stored in memory and the direct untransformed detection signals $|E_R|^2$.

In some embodiments, the detection apparatus includes a first detection element directed in a first direction, towards the entity, for generating non-polarized detection signals, and a second detection element, directed at 90 degrees to the first element, for generating cross-polarized detection signals, and wherein step (ii) includes the procedure of Appendix B.3, thereby producing fourth and fifth outputs (Output4, Output5) dependent upon the detection signals, wherein Output4 is, for each sweep channel, the sum of correlations between the transformed signals, the transformed signals comprising a Complex Fourier Transform of the non-polarized detection signals and of the cross-polarized detection signals, and Output5 is, for each sweep channel, the sum of the integrated non-polarized and cross-polarized signals after Complex Fourier Transform. In some embodiments, the integrated non-polarized and cross-polarized signals comprise integrations of transformed signals within one or snore distance windows, the contents of each distance window being stored in a database in association with a respective response for a particular weapon.

In some embodiments, step (ii) includes the procedure of Appendix B.4, thereby producing sixth and seventh outputs (Output6, Output7) dependent upon the detection signals.

In some embodiments, methods may further comprises providing a neural network, the neural network having as inputs thereto any combination of (a) the first and second outputs (Output1, Output2), (b) the third output (Output3), (c) the fourth and fifth outputs (Output4, Output5), and (d) the sixth and seventh outputs (Output6, Output7), wherein the output of the neural network is an indication of a confidence level of a metallic or dielectric object of a predetermined type being detected, for example, 1=gun detected, 0=no metallic or dielectric object detected.

Some embodiments of the present invention may include a recorded or recordable medium having recorded or stored thereon digital data defining or transformable into instructions for execution by processing circuitry, the instructions corresponding the systems and methods herein.

Some embodiments of the present invention may include a server comprising processing circuitry, memory and a communications device, the server being programmed for communicating on demand or otherwise digital data defining or transformable into instructions for execution by processing circuitry, the instructions corresponding to the systems and methods herein.

Techniques according to some embodiments of the invention entail actively illuminating an object with wide range stepped microwave or millimeter wave radiation and inducing a local electromagnetic field on the surface of the object and within the barrel, comprised of a superposition of modes.

The coupling to these modes from the illuminating and scattered fields is, in general, frequency dependent and this forms the basis for the detection and identification of conducting items. The object may be fully illuminated if a full spectrum of modes and therefore a full frequency response are to be excited and collected.

The scattered EM power may be typically measured at "stand off" distance of several meters as the illuminating field is frequency swept over as wide a range as possible and patterns in frequency response characteristic to the target object being sought are looked for.

This system may rely on contributions from one or more of the following effects.

(1) Swept reflectometry, in which the distances between corners, edges and cavities on the weapon independently from, the distances to the source and the detector are ascertained in real-time.

(2) Barrel tone detection. The caliber and barrel length of the weapon can be ascertained when the barrel is oriented towards the general direction, of a detector and source (±45°). This is determined by an aspect invariant method outlined in the appropriate section below.

(3) Cross-polarization effects. The use of two or more detectors, the first oriented in the same direction as the illuminating radiation and the second at 90° (the cross polarized detector) can yield important effects. The time dependent responses in the cross polarized detector are enhanced when a handgun is present. Furthermore, if the frequency is swept over a large range, the reflections from various corners of the object can be resolved in the time domain. These reflections are different or anti-correlated in the cross polarized detector. This differentiates the technique from previously known polarization-based detectors outlined above.

(4) Aspect independent effects (Late Time Responses). A late time response or recurrence from the object is identified, to effectively give information related to the size and dimensions of the object. This enables dimensions to be determined in truly aspect independent manner. This phenomenon is the further set of scattered signals obtained after the main radiation has returned to the receiver, assuming the application of a pulse of radiation. It is caused by locally induced currents in the object re-radiating. The timing of the response can be directly linked to the size and natural resonances of the object, and this is illustrated herein by simple objects with one or more dimensions. It can, therefore, prove a useful tool in the identification of weapons, optionally when combined with the other techniques identified herein.

The concept of target identification by utilising re-radiation from a metal object illuminated by a radar pulse, after that pulse has passed the object, has been used and understood for decades, primarily in dm field of radar for aircraft and missile identification purposes [e.g. Baum C. E "On the singularity expansion method for the solution of electromagnetic interaction problems", Air Force Weapons Lab. Interaction Notes, Note 88, December 1971] The present inventors demonstrate in this disclosure how techniques that build upon the baste principles can be used to confirm, the presence or the absence of weapons, especially handguns and knives, concealed on or about the human body.

When a highly conductive object, such as a metal handgun or knife, is illuminated by a sudden pulse of microwave frequency electromagnetic radiation there are surface currents excited on that object. When the exciting pulse has passed the object, the excited surface currents oscillate in such a way as to give rise to re-radiation that carries an electromagnetic signature which is unique to that object. Of critical importance and underpinning the techniques according to some embodiments is the fact that the re radiated signature is independent of such vagaries as pulse shape and object (target) orientation. This re-radiated electromagnetic signal is known as the Late Time Response (LTR) and it is this signal that is excited, captured and processed to interrogate the human body for concealed weapons, according to some embodiments of the present invention.

The techniques identified in this application are suitable for a deployable gun and concealed weapons detection system and does not rely on imaging techniques for determining the presence of a gun. One or more of the techniques can be combined to reduce the false-positive events from the detector. Hereinafter, experimental sets of responses from typical metal or partially conducting objects such as keys, mobile phones and concealed handguns at a range of frequencies are presented. According to another aspect of dm invention there is provided a system for remote detection and/or identification of a metallic threat object, comprising: a transmission apparatus, including a transmission element, configured to direct microwave and/or mm wave radiation in a predetermined direction, a detection apparatus configured to receive radiation from an entity resulting from the transmitted radiation and to generate one or more detection signals in the frequency domain, and control circuitry, the control circuitry being operable to (i) cause the transmitted radiation to be swept over a predetermined range of frequencies, (ii) perform a transform, operation on the detection signal(s) to generate one or more transformed signals in the time domain, (iii) extract, from, one or more features of the transformed signal, the late time response (LTR) signal of the metallic threat object upon which the transmitted radiation is incident, the metallic threat object being carried by or associated with the entity; and (iv) from the LTR signal, determine the presence and/or identity ox the metallic threat object. According to another aspect of the invention there is provided a method for remote detection and/or identification of a metallic threat object, comprising: providing a transmission apparatus, including a transmission element, configured to direct microwave and/or mm wave radiation in a predetermined direction, providing a detection apparatus configured to receive radiation from an entity resulting from the transmitted radiation and to generate one or more detection signals in the frequency domain, and control circuitry, the method comprising (i) causing the transmitted radiation to be swept over a predetermined range of frequencies, (ii) performing a transform operation on the detection signal(s) to generate one or snore transformed signals in the time domain, (iii) extracting, from one or snore features of the transformed signal, the late time response (LTR) signal of the metallic threat object upon which the transmitted radiation is incident, the metallic threat object being carried by or associated with the entity; and (iv) from the LTR signal, determine the presence and/or identity of the metallic threat object. According to another aspect of the invention there is provided a threat object detection system, for remote detection and/or identification of a metallic threat object being carried by or associated with the entity, comprising: a plurality of detection systems, each detection system being in accordance with any of claims 28 to 59 of the appended claims, the detection systems being arranged spaced apart in relation to a closed path defined by walls and to be traversed by the entity, whereby, in use, transmitted radiation from at least one of the detection systems is incident upon the entity. According to another aspect of the invention there is provided a computer program product for remote detection of one or more dimensions of a metallic or dielectric object, the computer program product comprising a computer usable storage medium having computer readable program, code embodied in the medium, the computer readable program code configured to carry out the method of any of Claims 14 to 27 or 66 to 92 of the appended claims.

An advantage of the invention is that effective detection of threat objects at stand-off distances may be accomplished.

A further advantage of the invention is that detection of threat objects using a portable device may be achieved.

A further advantage is that the detection of smaller dimensions (e.g. gun barrel dimensions and/or caliber) is enabled.

BRIEF DESCRIPTION OF THE FIGURES

Embodiments of the invention will bow be described in detail, by way of example, with reference to the accompanying drawings, in which:

FIG. 18(a) and FIG. 18(c) show a typical response of a human body with concealed handgun, FIG. 18(b) shows a similar trace with the handgun absent;

FIG. 20 shows the typical LTR response for representative metal objects, i.e. for simple objects (FIGS. 20(a) and 20(b)), and for a complex object (FIG. 20(c)) such as a handgun;

DETAILED DESCRIPTION OF THE EMBODIMENTS

Figure 1:
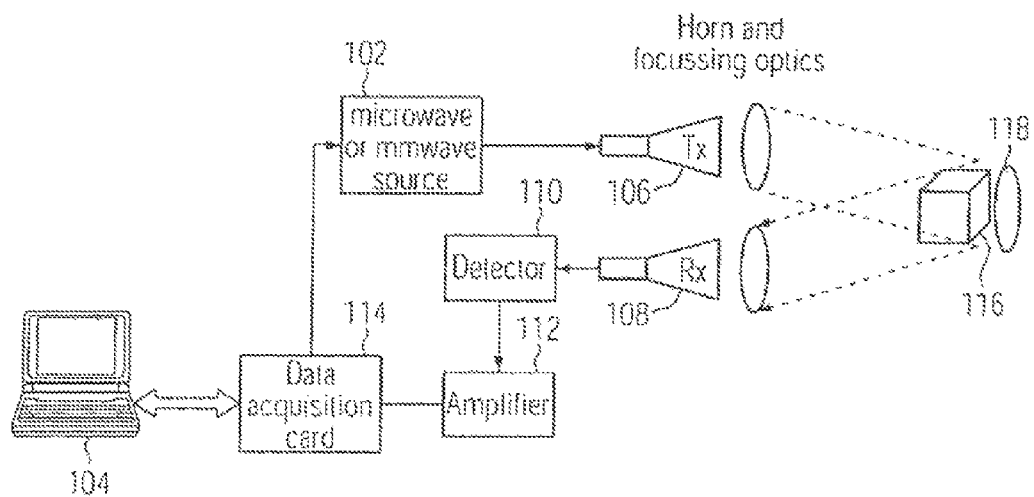
FIG. 1 is a block diagram of an object detection system according to some embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to tike elements throughout.

If will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there axe no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise, it will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs, it will be further understood that terms used herein should be interpreted as having a meaning that is consistent with their meaning in the context of this specification and the relevant art and wilt not be interpreted in an idealized or overly formal sense unless expressly so defined herein.

As used herein, "threat object" is taken to mean a metallic or dielectric object, whether specifically designed or intended for offensive use or not, that have potential to be used in an offensive or violent manner.

The present invention is described below with reference to flowchart illustrations and/or block diagrams of methods, systems and computer program products according to embodiments of the invention. It will be understood that some blocks of the flowchart illustrations and/or block diagrams, and combinations of some blocks in the flowchart illustrations and/or block diagrams, can be implemented by computer program instructions. These computer program instructions may be stored or implemented in a microcontroller, microprocessor, digital signal processor (DSP), field programmable gate array (FPGA), a state machine, programmable logic controller (PLC) or other processing circuit, general purpose computer, special purpose computer, or other programmable data processing apparatus such as to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block, or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Embodiments of the invention may be used for remotely detecting the presence and/or size of metal and/or dielectric objects concealed underneath clothing. Embodiments herein may be used for remotely detecting metal and/or dielectric objects. A dielectric in this context is a non-conducting (i.e. insulating) substance such as ceramic that has a low enough permittivity to allow microwaves to pass through. A ceramic knife or gun, or a block of plastic explosive, are examples of this type of material.

Some embodiments of detection systems are disclosed herein. FIG. 1 includes embodiments using direct detection without, phase detection and FIG. 2 includes phase detection embodiments. In some embodiments, the hardware may be embodied in a portable and covertly deployable system.

FIG. 1 is a block diagram of the threat object detection system according to some embodiments of the invention. For the direct detection (without the phase) responses, a detection system may include a microwave and/or mm wave source 102 (40 GHz Agilent Microwave Synthesiser), in some embodiments, the microwave and/or mm wave source 102 may comprise a separate component of the system. In some embodiments, the detection system may include a controller (PC) 104, two 20 dB standard gain horns used as transmitter 106 and receiver 108 for the Ku and Q bands, a zero-bias direct detector 110 followed by a DC amplifier 112, and a high speed data acquisition card (PCI-6132 National Instrument interface). In some embodiments, the system may be controlled using control software including Labview or C# code, among others. In some embodiments, free wave directional antennae may also replace horns to permit a wider scanning range.

The main procedure carried out by controller 104 in implementing a scan is set out in Appendix A at the end of this section of the Specification. The procedure "Perform transformation on received radiation signals to produce time domain or optical depth domain trace" in Appendix A, for each of the four techniques, is discussed later with reference to Appendix B.

In use and operation, the system may use electromagnetic radiation in the microwave or millimeter (mm) wave band, where the wavelength is comparable or shorter than the size of the object 116 to be detected. The object 116 may be on and/or in the body of a person, within containers and/or items of luggage, and/or concealed in and/or on some other entity (not shown). The suspect entity (e.g., a person; not shown) has radiation directed by transmitter 106 onto it, so that the (threat) object 116 is entirely illuminated by a continuous wave of this radiation (i.e., the radiation is not pulsed, bet kept continuously on). The radiation intensity is well within safe operating limits, but may be in any case determined by the sensitivity of the detector 110. As an example, in the range 14-40 GHz, 0 dBm of power is used with a typical beam area 118 of 0.125 $m^2$ which equates to a 20 cm diameter beam. However, in some embodiments, the hardware may be designed so as generate a beam area 118 of greater or lesser size.

The frequency and consequently the wavelength of the radiation, is swept through a reasonable range and may be referred to as swept CW and/or continuous wave radiation. Limits may be set by the devices used, but a 20 GHz or more sweep starting at 14, 50 or 75 GHz is typical. The data may be collected in a series of small steps and/or as a real-time continuous sweep. Typically 256 or more data points may be acquired. In some embodiments, data may be taken between 14 to 40 GHz, providing a sweep range of 26 GHz.

The illumination and detection may be undertaken remotely from the object 116 in question, for example, at a distance of a meter or more, although there is no lower or tipper limit on this distance. The upper limit on detection distance may be set by the millimeter or microwave focussing optics, although, with this technique, a small beam at the diffraction limit is not necessary, in some embodiments, ranges for this device may include a few tens of centimeters (cm) to many tens of meters (m). In some embodiments, a device may be operated at a range of approximately 1 m to 10 n depending on the frequency chosen (some microwave frequencies are attenuated by the atmosphere, and atmospheric windows such as that found around 94 GHz are generally chosen to minimise these effects). In some embodiments, the source of electromagnetic radiation 102 and the detector 110 may be mounted next to each other and they may be focussed onto some distant object 116 or entity (not shown).

A variety of techniques is disclosed herein and may include distinct system and/or method recitations. For example, swept reflectometry and barrel tone detection, may provide that the return radiation is detected and its amplitude stored as a function of frequency. In this regard, embodiments of a system as illustrated in FIG. 1 may be used.

Other techniques, including cross-polarization and LTR recurrences may use the phase of the returned radiation that may be acquired at each frequency point. When the phase of the returned signal is used—in order to replicate a Time Domain response via the use of a Fourier Transform—the synthesiser and detection system in FIG. 1 may be replaced by a four port Vector Network Analyser (VNA) (for example 40 GHz Rohde Schwarz SVA Vector Network Analyzers) or other device capable of obtaining the phase and amplitude of the returned signal, once again swept from 14 to 40 GHz in small steps.

Figure 2A:
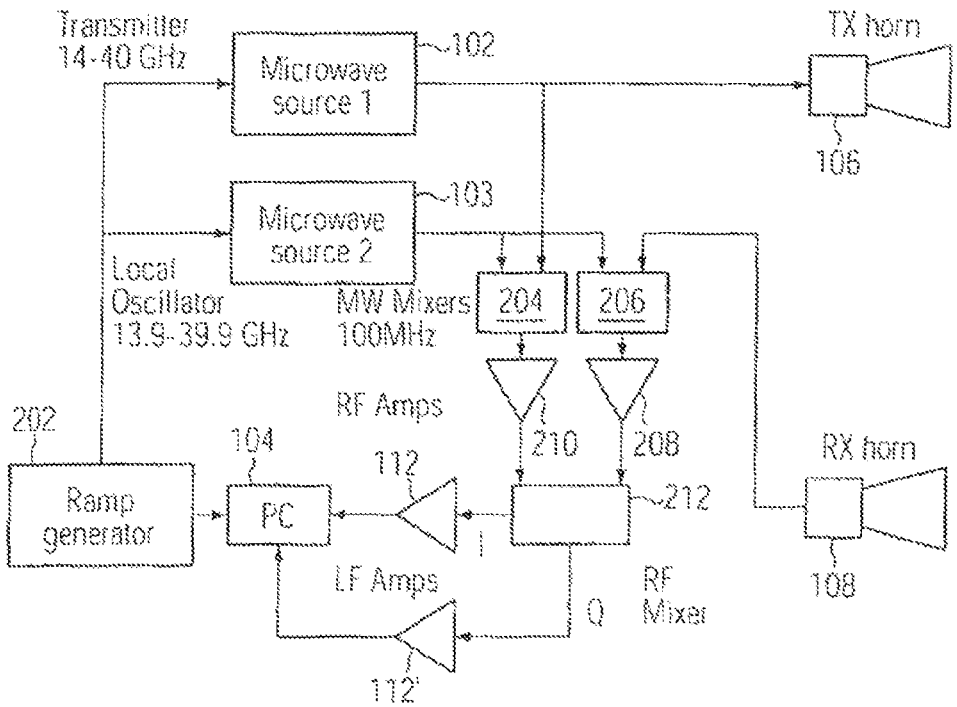
FIG. 2(a) shows a block diagram of an object detection system according to some embodiments of the Invention.

FIG. 2(a) shows a block diagram of an object detection system according to some embodiments of the invention. As illustrated, components of the VNA may be included in some embodiments. Others of the system components are discussed above regarding FIG. 1, except as described below.

The frequencies of the first and second microwave sources 102 and 103 may be swept under control of the signal from the Ramp Generator 202 to remain approximately 100 MHz apart. The Microwave mixers 204, 206 generate signals corresponding to the difference frequency between the two inputs (~100 MHz). After amplification by two RF amplifiers 208, 210, a RF Mixer 212 produces two outputs corresponding to the "in phase" (I) and "in quadrature" (Q) components of the detected signal. The signals may be amplified by amplifiers 112, 112', and the data acquisition may be controlled by a controller 104 (PC). The entire system apart mom the horns 106, 108 may be referred to as a Vector Network Analyser (VNA).

The return signal is collected by a born and applied to port 2 of the VNA, which measures parameter S21. If cross-polarisation measurements are used, a second receiver horn oriented (not shown) at 90° may be added to the VNA on, for example, port 3. The transmitted signal may be generated front port 1 and may be, for example, 1 mW. The real and imaginary parts may be recorded and can be corrected for the electrical behaviour of the horns. The signals are zero padded out to 4096 points and are processed by a Fast Fourier Transform routine to yield the effective time response. In this manner, the process allows the replication of the application of a pulse of radiation to the target (entity) and the subsequent acquisition of the time resolved response.

Figure 2B:
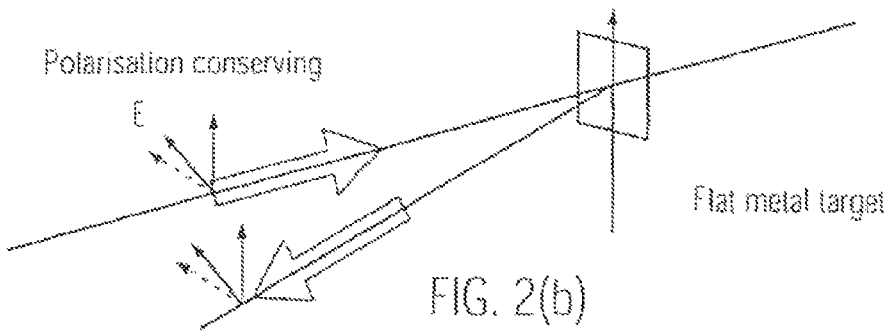
FIGS. 2(b) and 2(c) show the different behaviour of smooth and jagged conducting targets in response to linearly polarized microwave radiation.
Figure 2C:
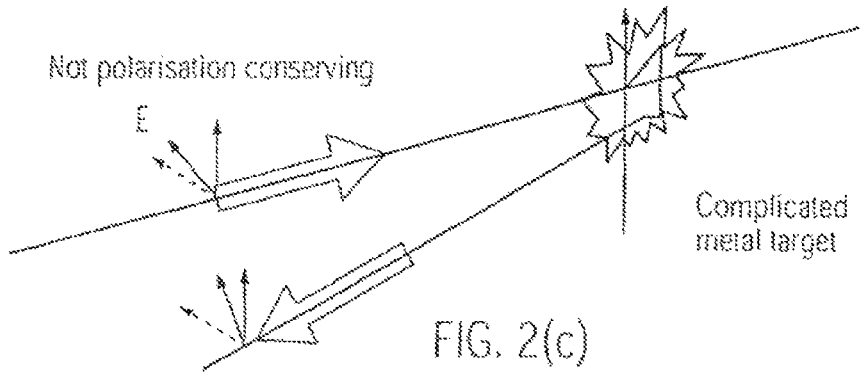

FIGS. 2(*b*) and 2(*c*) show the different behaviour of smooth and jagged conducting targets in response to linearly polarized microwave radiation. A single reflection from a metal surface produces a signal polarized in the same manner as the incident signal—polarization is conserved as illustrated in FIG. 2(*b*). However, multiple reflections on/wound the target will rotate the direction of polarization as illustrated in FIG. 2(*c*). In some embodiments, this can be detected by using an additional waveguide horn (not shown) that is rotated 90 degrees relative to the first horn 108, thus blocking the polarization conserving signal.

In some embodiments, hardware corresponding to the systems herein may form and/or be part of a portable device (i.e. small enough to be carried by one person, or transported in an automobile, so as to be operable therein).

Theoretical Basis.

To detect the range of signals described herein, several measurement techniques are available. For a transmitted signal $E_0 e^{-j\omega t}$ the return signal $E_R$ from a target (entity) distance L away may be written as follows:

$$E_R = rE_0 e^{-j\omega t} e^{2j\omega L/c} \quad (1)$$

where $\omega = 2\pi f$, f is the frequency, r the scattering coefficient and c the velocity of light.

A detector 110, which may respond to the microwave power, will only measure $|E_R|^2$, which for a single scattering center, does not explicitly depend on frequency. However, for two scattering segments at different ranges $L_1$ and $L_2$, the power is proportional to:

$$|E_R|^2 = |r_1 e^{2j\omega L_1/c} + r_2 e^{2j\omega L_2/c}|^2 \quad (2)$$

This contains terms in $\cos(2\omega(L_1-L_2)/c)$ (i.e., oscillatory terms) that are dependent on the difference in range $L_1-L_2$. By performing a Fourier transform on the detected power measured as a function of transmitted frequency, peaks corresponding to the difference in range of various parts of the target are observed and these give an indication of the size of the object 116. However, for a complicated object 116, many pairs of distances would be involved and the analysis of the signal would be complex.

For a different group of detectors (i.e. Vector Network Analysers as illustrated in FIG. 2(*a*)), it is possible to measure the complex returns signal directly. These Vector Network Analysers effectively mix the return signal with a fraction of the transmitted wave to measure $$r_1 e^{2j\omega L_1/c} + r_2 e^{2j\omega L_2/c}$$

in terms of its real and imaginary parts, in this case Fourier Transforming leads to a series of signal peaks at the range of each element of the target and arranged in the order of their distance. Thus, a much clearer indication of the dimensions of the object 116 may be obtained, though only in one dimension. Any Late Time Responses (i.e. those that cannot be attributed to direct scattering) can be measured in this way, although their strength may be many times less than directly reflected signals.

Further information about the target (entity) may be obtained using a second detector to collect return signals emitted at a different angle from the target. This effectively probes the target along a second direction and can in principle enable more dimensions of the object 116 to be ascertained.

A Fourier Transform (FT) or some other snore advanced power spectrum analysis technique such as a Burg Transform may be applied. The Burg and related methods of power spectrum analysis may be better than the FT for this application as the individual peaks that relate directly to the dimensions of the object are more clearly identifiable, and as it is possible to choose the number of peaks to be displayed in the output (and hence reject weaker peaks). They may also allow two closely spaced peaks to be resolved.

Figure 5:
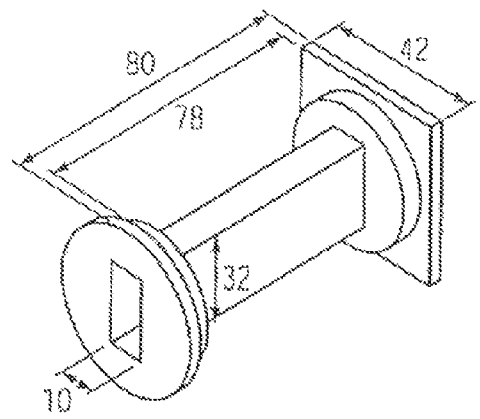
FIG. 5 shows a sample metal object (an X band waveguide connector) with dimensions, as used in testing the system of FIG. 1 to generate the data of FIG. 3.
Figure 3:
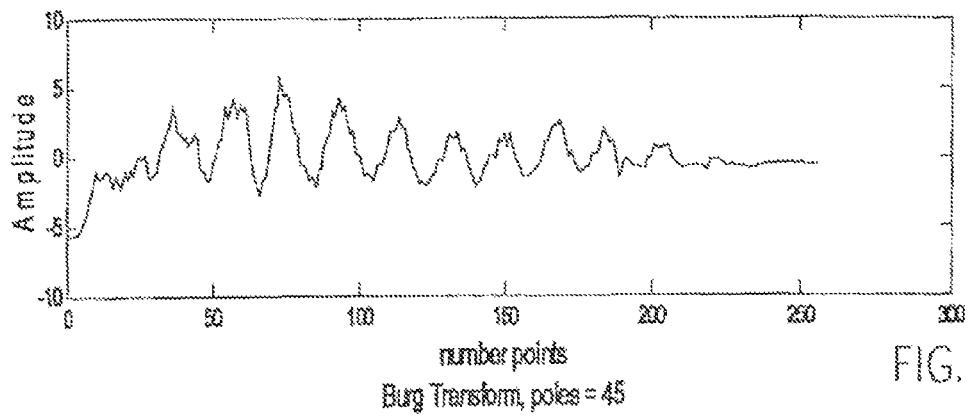
FIG. 3 shows the original data (amplitude vs frequency) for the radiation detected by the system of FIG. 1 from the scan of an x-band waveguide of major dimension 80 mm.
Figure 4A:
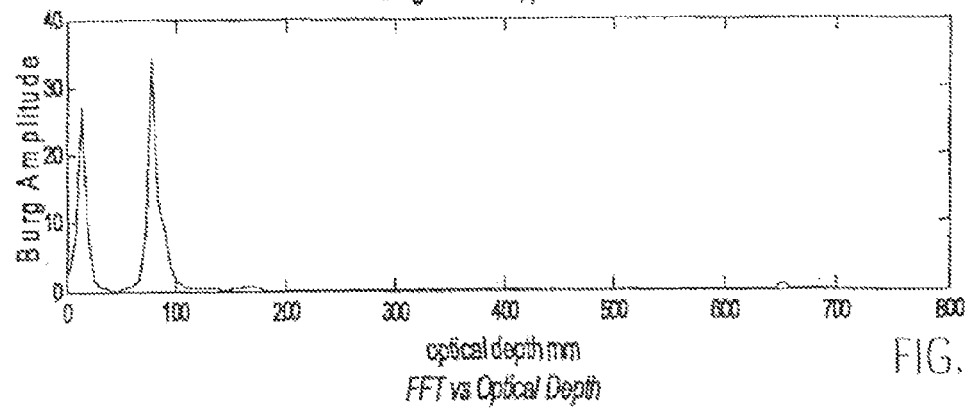
FIGS. 4(a) and 4(b) illustrate respectively Burg and Fourier transforms of the data set of FIG. 3.
Figure 4B:
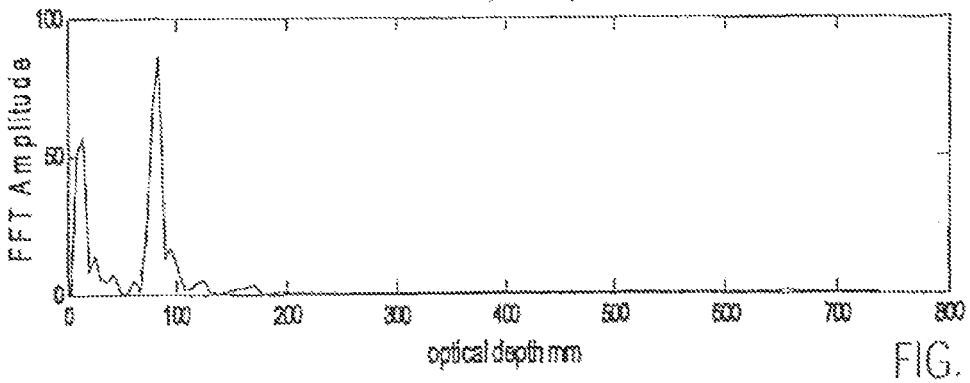

FIG. 3 shows original experimental data (amplitude vs frequency) for the radiation detected by the system of FIG. 1 from the scan of an x-band waveguide of major dimension 80 mm. FIGS. 4(*a*) and 4(*b*) illustrate respectively Burg and Fourier transforms of the data set of FIG. 3. FIG. 5 shows a sample metal object (an X band waveguide connector) with dimensions, as used in testing the system of FIG. 1 to generate the data of FIG. 3. The Fourier Transform (FIG. 4(*b*)) and Burg Transform (FIG. 4(*a*)) are presented for comparison. The peak at 80 mm corresponds with the length of the waveguide. The Burg algorithm as identified in FIG. 4(*a*) is much less cluttered than a conventional FT as illustrated in FIG. 4c. The Burg algorithm is used here to turn the frequency sweep into a power spectrum. In this regard, the peaks in the power spectrum may directly give the various dimensions and/or lengths of the metal and/or dielectric object, after appropriate scaling.

The position L of peaks within the FFT or Burg spectrum directly relate to the size of the object rising the following formula:

$$L = \frac{c}{2\Delta f}$$

Where c is the speed of light. $\Delta f$ the periodicity in the frequency domain. This axis represents optical depth for the purposes of tins disclosure.

The minimum spatial resolution d is related to the sweep range or bandwidth BW:

$$d = \frac{c}{2BW}$$

As an example, if the source frequency were to be swept between 14 and 40 GHz, this constitutes a sweep range of 26 GHz, which translates to a resolution of 5.7 mm. A larger sweep range would lead to an improved resolution, which may result in, for example, a maximum optical depth or distance of 740 mm for 256 data points. In some embodiments, the number of data points may include more that 256 including, for example, 512, 1024 or any multiple thereof, among others. For Vector Network Analysers operating in Time Domain mode, in which the complex data is converted to the lime domain, this calculation may be included in the software.

The four techniques mentioned above, each of which may be used in embodiments of the invention, will now be discussed in more detail.

Technique 1: Swept Reflectometry.

As briefly described above, swept reflectometry is the principle by which the distances between corners, edges and cavities on the threat object (weapon) 116 independently of the distances to the source (TX horn 106; FIG. 1) and the detector (RX horn 108; FIG. 1) may be ascertained in real-time. Here, $|E_R|^2$ as described above is the measured quantity. The distance to the target (entity) may not always be available.

If the object 116 (e.g. a weapon strapped to the body as the latter rotates) is moved around in the beam and its angle and distance with respect to the source and detector is changed, those dimensions between edges and corners that actually belong to the object can be differentiated from those that do not. In this manner, the background clutter may be removed. Some embodiments of a procedure carried out by controller 104 (FIG. 1) in implementing a scan is set out in Appendix A at the end of this section of the disclosure. The procedure "Perform transformation on received radiation signals to produce time domain or optical depth domain trace" for Technique 1 is set out in Appendix B.1 at the end of this section of the disclosure.

The software according to Technique 1 may differentiate the peaks that relate to the dimensions of the object 116 from those that do not by acquisition of the signal over a period of time and by storing these acquired signals independently, with the object moving within the beam. The signals that indirectly relate to the dimensions of the object remain and occur within certain bands denoted by the distances between the various corners of the object. Other signals that change (e.g., the air gaps between clothing and the skin) may be more chaotic and may be integrated out over a period of time.

If the strength of the signal is normalized relative to distance, the returns from a subject concealing a handgun will be larger in amplitude than those without.

Figure 6:
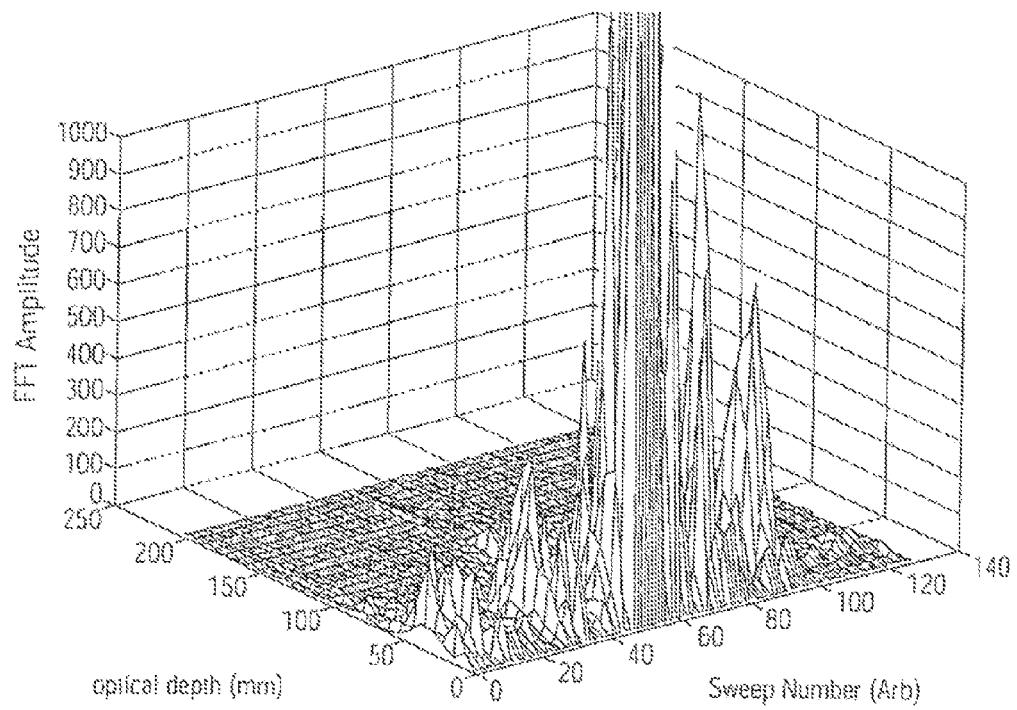
FIG. 6 shows a comparative plot of the Fourier Transformed data taken from a repeated rapid scan between 14 to 40 GHz at a standoff distance of a person with small handgun that was strapped to the front of the person, as the person rotated round slowly within the beam, using the system of FIG. 1 or 2(a), and using swept reflectometry techniques according to embodiments of the invention.
Figure 7:
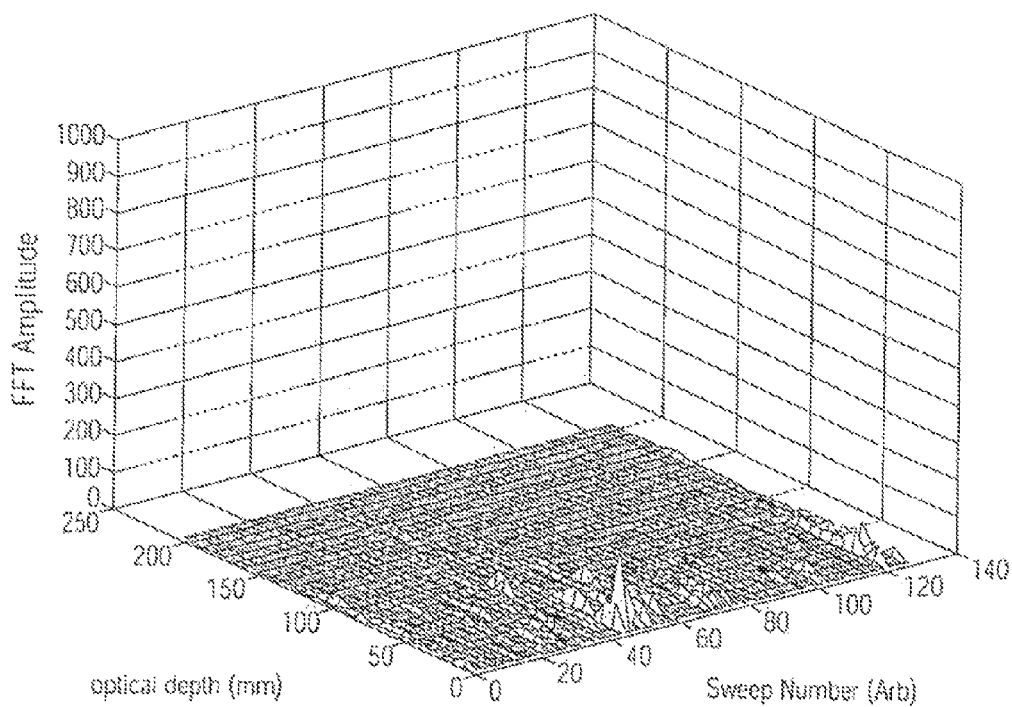
FIG. 7 illustrates the same plot as in FIG. 6, but with the handgun absent.

FIG. 6 shows a comparative plot of the Fourier Transformed data taken front a repeated rapid scan between 14 to 40 GHz at a standoff distance of a person with small handgun strapped to the front of the person, as the person rotated round slowly within the beam, using swept reflectometry techniques according to embodiments described herein. FIG. 7 illustrates the same plot as in FIG. 6, but with the handgun absent. The scans are presented in three dimensions, with the scan number on the X axis, optical depth on the Y axis and the amplitude of the power spectrum (arbitrary units) on the Z axis. In FIG. 6, many resonances can be seen below 100 mm with the gun present, denoting the various distances between corners and edges of the weapon. The second plot (FIG. 7) shows the response from the body alone at the same standoff distance and with the body rotating in the same manner.

Very large dimensions, such as, for example, metal doors, window frames and/or a multitude of other metal objects will not be observed as they are not entirely encompassed by the beam, as the microwave beam can be focused onto relevant pans of the person (entity) or object 116 in question.

The reflected return radiation is seen to contain patterns or frequencies that can be indirectly related to the dimensions of the metal object according to the technique identified in the section "Theoretical basis" above, including the presence and/or length of gun barrels. In this manner, embodiments herein may be used to discriminate between, say, handguns and keys, knives and keys, etc. In effect, the technique measures the distances between the various edges of the object at the orientation of the source and detector, and cavity lengths if present.

The dimensions of guns and knives are different from most other objects carried about the person, so the appropriate dimensions may be stored on a database.

The technique (Technique 1) is also capable of measuring, particularly, the depth of a dielectric (i.e., of a material that does not conduct electricity), although the physics behind this may be significantly different. A dielectric object might typically be a lump of plastic explosives concealed on a suicide bomber.

Figure 8A:
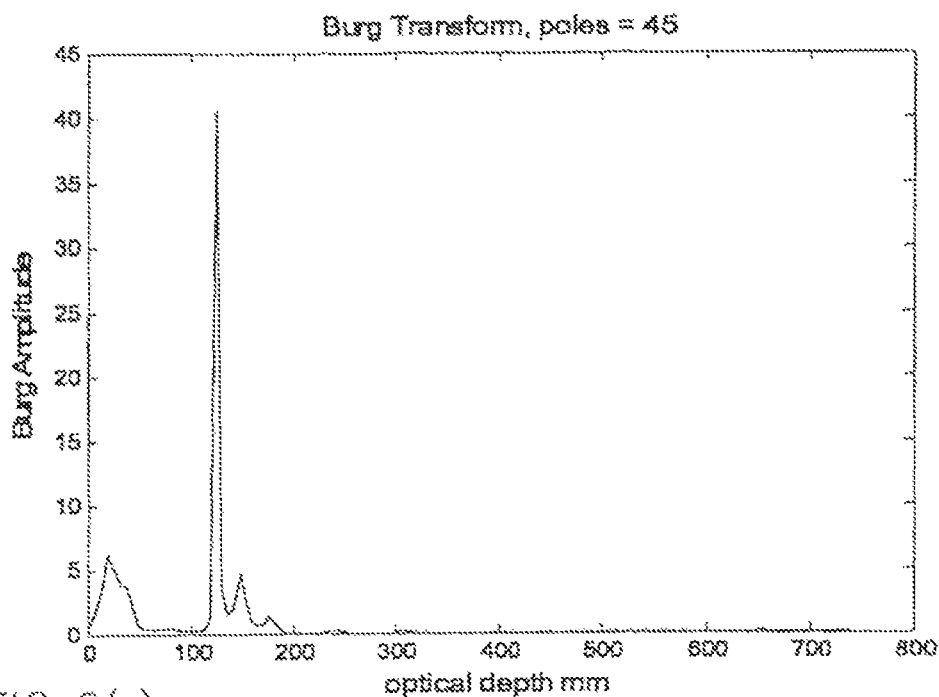
FIG. 8(a) shows a plot using the Burg transform for a scan of a person with simulated plastic explosive strapped to their midriff, using swept reflectometry techniques according to embodiments of the invention.
Figure 8B:
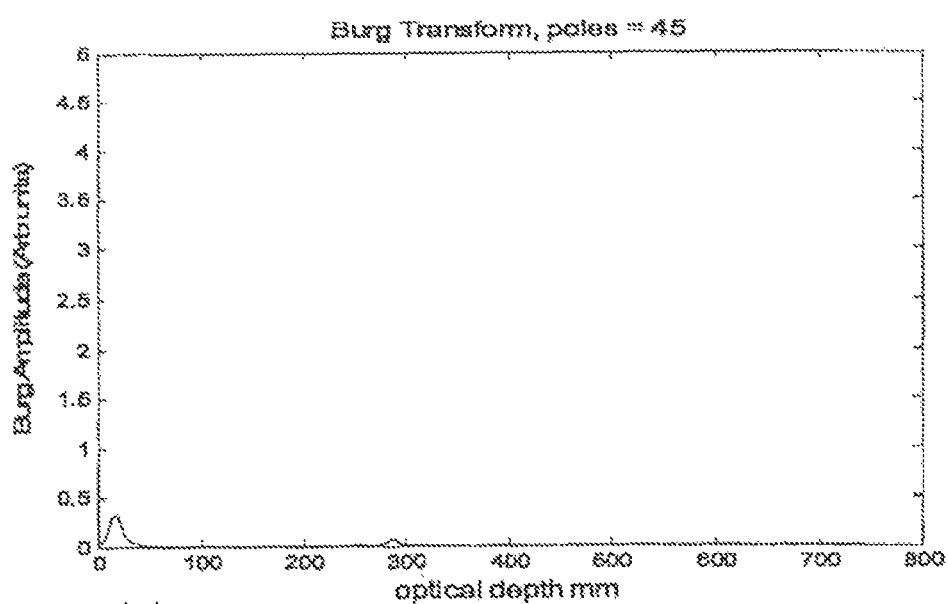
FIG. 8(b) shows the same plot as in FIG. 8(a), but with the simulated plastic explosive absent.

FIG. 8(a) shows a plot using the Burg transform for a scan of a person with simulated plastic explosive strapped to their midriff, using swept reflectometry techniques according to some embodiments of the invention, and FIG. 8(b) shows the same plot as in FIG. 8(a), but with the simulated plastic explosive absent. The Burg transform (FIG. 8(a)) is of a 14-40 GHz scan of a person carrying an 80 mm thick block of plastic explosive stimulant with a dielectric constant of 1.5, giving an apparent optical depth of 120 mm.

Technique 2: Barrel Tone Detection by Direct Detection of Aspect-Independent Chirped Signals.

Threat objects that contain cavities and can be excited by an incoming microwave signal, can exhibit strong frequency dependence in the scattered signal. These signals may differ from those derived from dm outside of the object by:

1. Showing a threshold frequency for stimulation (cut-off),

2. Being less dependent on alignment of the cavity with respect to the microwave direction.

For example, consider a 10 cm long cylindrical metal barrel closed at one end, which has 19 mm outside diameter and 9 mm inside diameter. The H11 mode has the lowest threshold frequency $f_0$ for propagation for the inside bore at 19.5 GHz. For a cavity length L, the response for f greater than $f_0$ is proportional to the chirped sine wave signal:

$$|E_R|^2 \propto \cos(2\pi\sqrt{(f^2-f_0^2)}(2L/c)+\phi) \qquad (3)$$

where f is the microwave frequency and c is the velocity of light, with a minimal return at lower frequencies below this threshold.

A procedure according to some embodiments that may be carried out by controller 104 (FIG. 1) in implementing a scan is set out in Appendix A at the end of this section of the disclosure. The procedure "Perform transformation on received radiation signals to produce time domain or optical depth contain trace" for Technique 2 is set out in Appendix B.2 at the end of this section of the disclosure.

Figure 9:
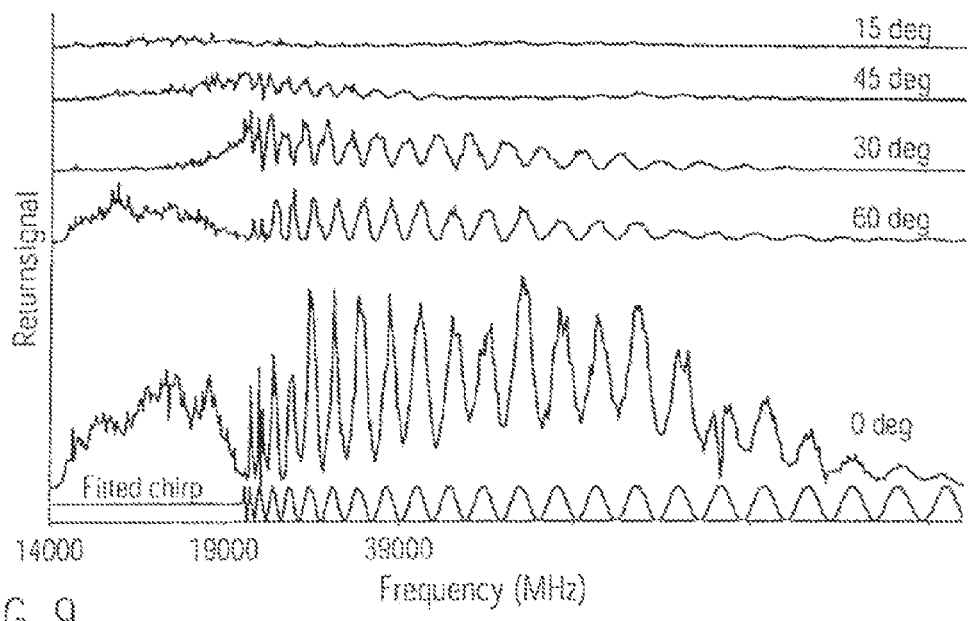
FIG. 9 illustrates measured frequency response of detected signal front a metal barrel with axis aligned at the angles shown to the microwave propagation direction, using barrel tone detection techniques according to some embodiments of the invention.

FIG. 9 illustrates measured frequency response of detected signal from a metal barrel with axis aligned at the angles shown to the microwave propagation direction, using barrel tone detection techniques according to the embodiments of the invention. As shown in FIG. 9, the return signal clearly shows the onset of the oscillatory response above the threshold $f_0$. In this regard, the onset of chirped oscillations occurs when the microwave frequency is beyond cut-off for propagation through the bore of the barrel. The bottom trace shows the optimum calculated chirped response.

It should be noted that the signal is clearly seen at a range of impact angles θ ranging from 0 to over 45° and the oscillation frequency is only a function of the cavity length L. This may be contrasted with the case of edge or corner detection where the oscillation frequency is proportional to L cos θ. The analysis provides a means of determining both the length and diameter of the cavity bore.

Figure 10:
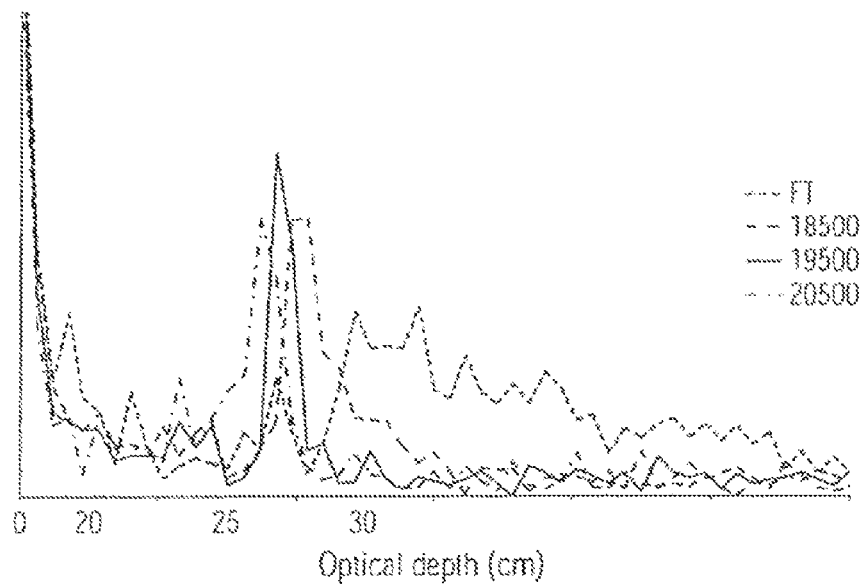
FIG. 10 shows correlation of the observed signal with the calculated chirped response function for three different values of $f_0$ and the direct Fourier transform, using barrel tone detection techniques according to some embodiments of the invention.

FIG. 10 shows correlation of the observed signal with the calculated chirped response function $\cos(2\pi(f^2-f_0^2)^{1/2}(2L/c)+\phi)$ for three different values of $f_0$ and the direct Fourier transform ($f_0=0$) using barrel tone detection techniques according to some embodiments of the invention. In FIG. 10 the measured signal is correlated with the chirped wave response for particular values of threshold frequency $f_0$. The correlated signal clearly peaks at the actual length L, i.e. 10 cm. It can be seen that this signal is much sharper than the direct FT, i.e. when $f_0=0$ and the signal is strongly dispersed. Stated differently, the correlation function is sharper and more symmetric when $f_0$ is equal to the true threshold frequency of 19500 MHz. It is also significantly narrower and more symmetric than when the assumed value for $f_0$ is higher or lower than the correct value. This provides a method of determining both the diameter and length of a cylindrical cavity and thus identifying a threat object such as a gun barrel.

Technique 3: Identification of the Target by Cross-Polarized Detectors.

By measuring the return signal as a function of frequency scanned over a wide range, the dimensions may be recovered through Fourier Transform techniques. This duplicates the effect of responses of targets to a very short excitation pulse without the need of high speed switches and ultra-fast detectors and digitization processes. The range resolution obtainable is of the order of 0.5-1.0 cm, as described by the principles above, at the sweep ranges available here (14-40 GHz, but this property is not restricted to this frequency range), and thus appropriate for characterizing objects such as hand guns.

Another useful aid to threat object identification is to measure the polarization of the return signal. Waveguide horns (see FIG. 2(a)) act as excellent polarizers and if the transmit 106 and receive 108 horns are similarly oriented, then polarization conserving components are detected. However, a second horn rotated about its axis by 90 degrees will be blind to "normal" polarization conserving signals and only detect "cross" or polarization changing signals. Conducting materials with a smooth surface, including the human body, are mainly polarization conserving. However, complicated targets that involve multiple reflections at different angles and particularly metal objects with sharp edges, give rise to significant "cross" polarized signals, which can lead to good discrimination, for example of a hand gun next to the body.

Embodiments of a procedure carried out by controller 104 (FIG. 2(a)) in implementing a scan is set out in Appendix A at the end of tins section of the disclosure. The procedure "Perform transformation on received radiation signals to produce time domain or optical depth domain trace" for Technique 3 is set out in Appendix B.3 at the end of this section of the disclosure.

The responses of a range of objects using a system as illustrated in FIG. 2(a) with a second receiver horn oriented (not shown) at 90° and with a cross-polarized detector (not shown) placed almost immediately above the first detector are analysed. The test targets ranged from a human alone, front and side, the same configuration with a concealed small handgun, a bunch of keys, a mobile phone and a digital camera.

Figure 11:
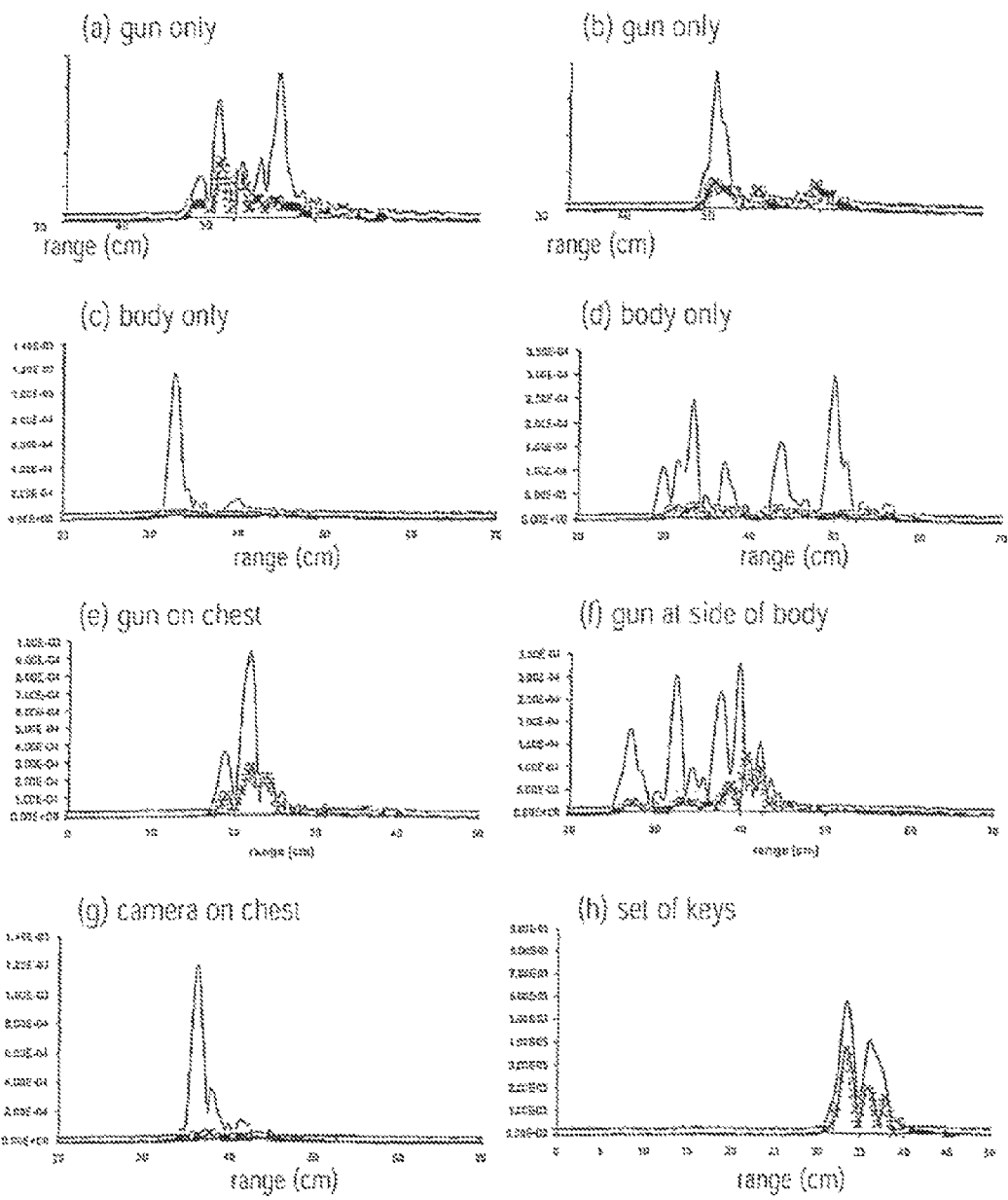
FIG. 11 shows representative signals, displayed in the time domain, from a number of targets—in each case the signal has beers measured simultaneously with separate horns in two polarizations, using cross-polarization detection techniques according to some embodiments of the invention.

FIG. 11 shows representative signals, displayed in the time domain, from a number of targets—in each case the signal has been measured simultaneously with separate horns in two polarizations, using cress-polarization detection techniques according to embodiments of the Invention. FIG. 11 shows the relevant section of the responses, illustrating distance and object information before and after the target has been removed. In each case, the signal has been measured simultaneously with separate horns in two polarizations, parallel to the transmitted beam (single line) and at right angles (crossed line). The quoted range is only relative, in some embodiments the targets are 1-2 m away from the horns. Signals (a) and (b) are from, a small hand gun, (c) and (d) from the chest area of a human body in different orientations, (e) and (f) are for the gun held next to the body, (g) for a small camera held, and (h) for a set of keys. It can be can be seen that quite distinctive behaviour is found for the gun in the two polarizations when compared to the body alone and with objects with flat surfaces.

In accordance with Technique 3, the very wide sweep range leads to detailed information about the dimensions of the object 116 and the fine structural distances between the source/detector 106/108 and corners/edges on the target/object 116. It can be seen in FIG. 11(a) that the signal from the cross-polarized detector (crossed line) is not only enhanced by the presence of the weapon, but the structural detail is to some extent anti-correlated. Compare this plot to the one taken from the body-only, where the cross polarized detector shows little information. Similarly, when the gun is placed on the body (either in front or at the side), the cross-polarized signal is once again enhanced, with a degree of anti-correlation between the normal (solid line) and cross polarized (crossed line) detectors.

Technique 4: Target Determination by Aspen Independent Effects (Late Time Responses).

The Late Time Response (LTR) and the closely associated Singularity Expansion method (SEM) arose from the observation that the time-resolved radar signature from conducting objects contains information after the radar pulse has passed the target.

The pulse sets up currents on the surface of the object 116 in the form of resonant modes, which subsequently re-radiate. An alternative interpretation is to consider the radar pulse stimulating travelling waves on the surface of the target, which move across and around the object 116 until they return back to their initial distribution. This recurrence can re-radiate back into the return beam, which appears an extra, time-delayed signal.

An important feature of the LTR is that the time taken for the travelling wave to circulate around the object does not depend on the orientation of the entity/object 116, and hence is aspect-independent, although its strength may depend on the efficiency of coupling into the modes. For objects 116 with symmetry the time-delay is approximately half the perimeter with respect to centre of the object 116. For more complicated objects, the LTR signal is more complex, but the structure can be interpreted in terms of the dimensions of the object 116. These include dimensions cross range as well as the usual along range values.

Figure 12:
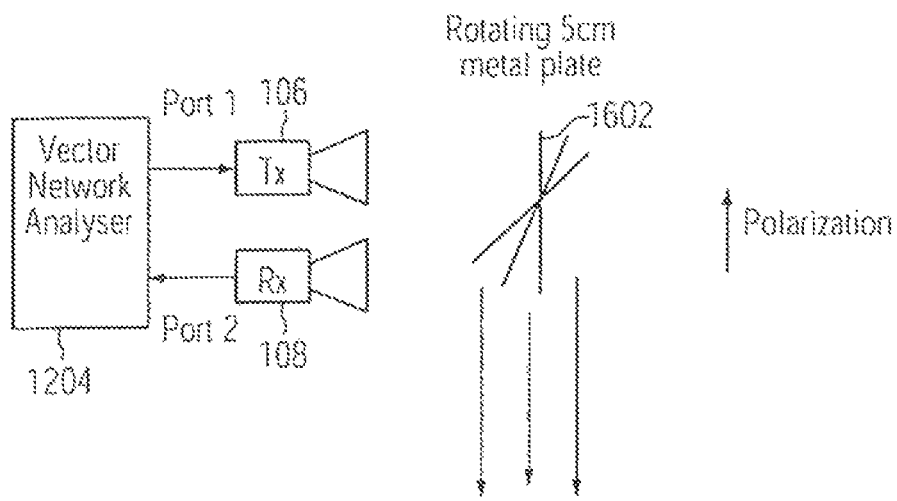
FIG. 12 illustrates the scanning of a simple metal plate using later time response techniques according to some embodiments of the invention, with the EM field polarized in the direction of the 5 cm dimension.

FIG. 12 illustrates the scanning of a simple metal plate 1202 (PCB) using later time response techniques according to some embodiments of the invention. The return signal from a rectangular piece of copper coated PCB was measured. Its narrow dimension (50 mm) is oriented in the plane of the microwave electric field and the long dimension (200 mm) is at right angles to the polarization direction and the direction of propagation.

The return signal is collected by a second horn close to the transmitting horn and is measured and applied, for example, to port 2 of a VNA 1204. The S21 parameter is recorded over a range typical range 14-40 GHz. The signals were corrected for the performance of the microwave horns 106, 108.

If the plate 1202 of width L is rotated by angle θ about its long direction, then scattering from its leading and trailing edge leads to a doublet response with separation L sin θ.

A procedure according to some embodiments may be carried out by controller 104 (FIG. 2(*a*)) in implementing a scan and is set out in Appendix A at the end of this section of the disclosure. The procedure "Perform transformation on received radiation signals to produce time domain or optical depth domain trace" for Technique 4 is set out in Appendix B.4 at the end of this section of the disclosure.

Figure 13:
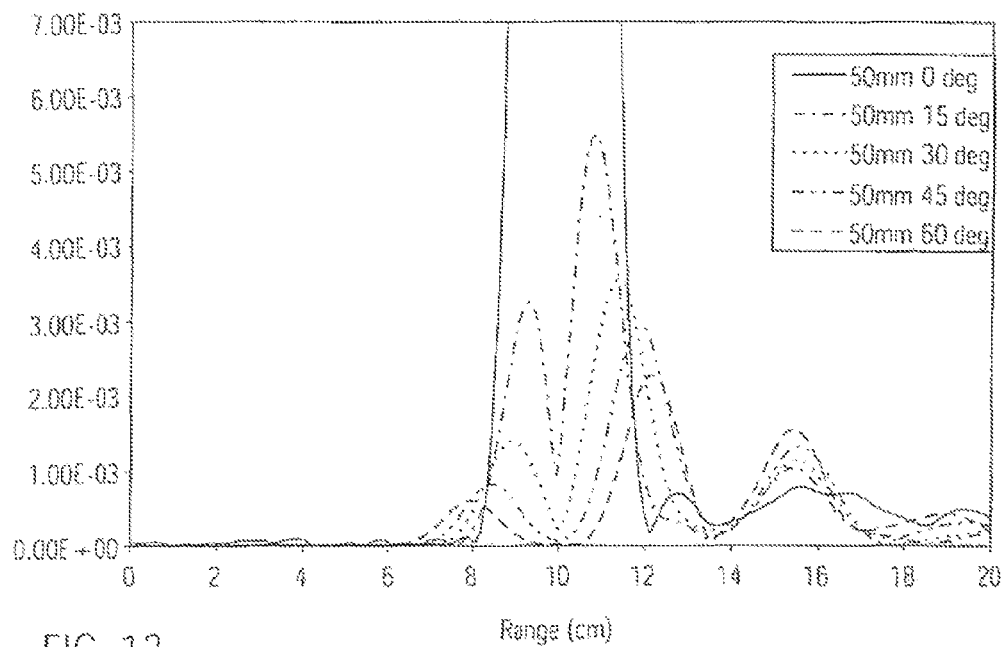
FIG. 13 shows the time domain response of the 5 cm wide flat sheet of FIG. 12, rotated through various angles between 0 and 60 degrees, using later time response techniques according to some embodiments of the invention.

FIG. 13 shows the time domain response of the 5 cm wide flat sheet of FIG. 12, rotated through various angles between 0 and 60 degrees, using later time response techniques according to some embodiments of the invention. The scattering from leading and trailing edges is centered around 10 cm. There is also a clear Late Time Response at 15 cm whose amplitude is largely independent of angle. Also seen in FIG. 13 is a LTR response at a fixed distance of 5 cm.

Figure 14:
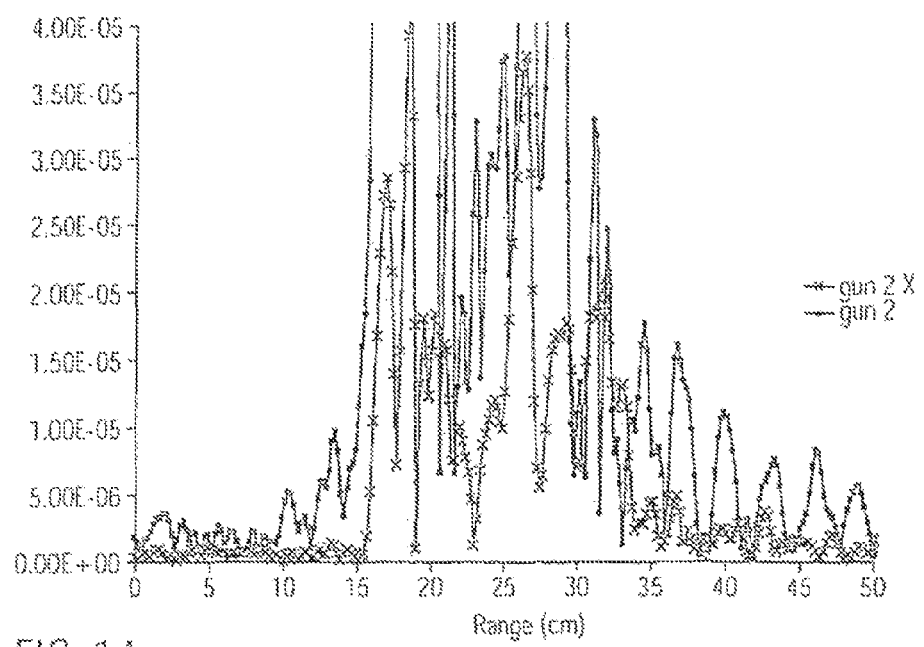
FIG. 14 shows a typical late time responses from a concealed handgun, including the cross-polarized signals (crossed line), using later time response techniques according to embodiments of the invention.

FIG. 14 shows late time responses from a concealed handgun, including the cross-polarized signals (crossed line), using later time response techniques according to some embodiments of the invention. This shows hie decaying oscillatory responses after 30 cm, being typical of late time responses from complex objects. The cross-polarised signal is denoted by the crossed line.

Figure 15:
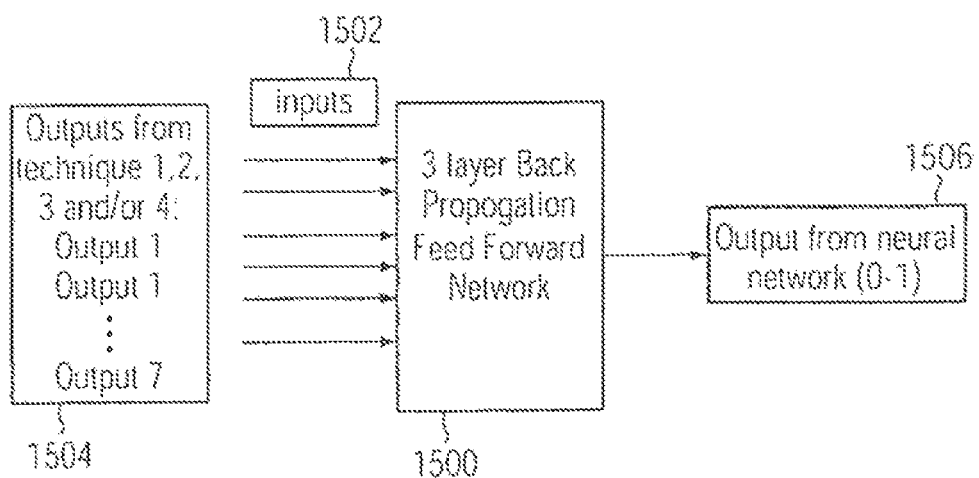
FIG. 15 shows schematically the use of a neural network to make decisions on whether a threat object is present, based on inputs determined by techniques according to some embodiments of the invention.

FIG. 15 shows schematically the use of a neural network 1500 to make decisions on whether a threat object is present, based on inputs 1502 determined by techniques according to some embodiments of the Invention. The outputs 1504 from the one or more of the above-mentioned Techniques 1 to 4 may be taken to the neural network classifier (e.g., a back propagation feed forward network) that has been pre-trained on sets of the type of concealed threat objects 116 that will be of concern, in addition to harmless items.

The training data may be formed of sets of data taken using the above-described techniques, in random order. The output 1506 from the neural network may be a single output that gives a confidence level (1=gun, 0=no object being concealed). However, it will be appreciated that other configurations or learning algorithms may be used. For example, multiple outputs from the neural network 1500 may be employed, with sub-classifications (e.g., gun, mobile phone, keys, etc).

The millimeter wave reflected signals from the guns show a number of features which enable them to be distinguished from innocently carried objects such as keys and mobile phones. These include cavity mode oscillations from the barrel with characteristic frequency of onset that allows the caliber and length to be determined. The interference of signals from different parts of the target leads to a frequency-dependent response, which can be used to deduce the size of the object. The response at different polarizations may give an indication of the complexity of the object from multiple reflections. The late time response gives an aspect-independent signal dependent on target dimensions. Taken together these features provide a means of detecting handguns, for example, under practical conditions at stand-off distances. The application of signal processing techniques enable relevant parameters to be extracted for use in automatic detection systems.

Embodiments of the system forming extensions and variants of Technique 4: Target Determination by aspect independent effects (Late Time Responses), will now be discussed in more detail.

Figure 16A:
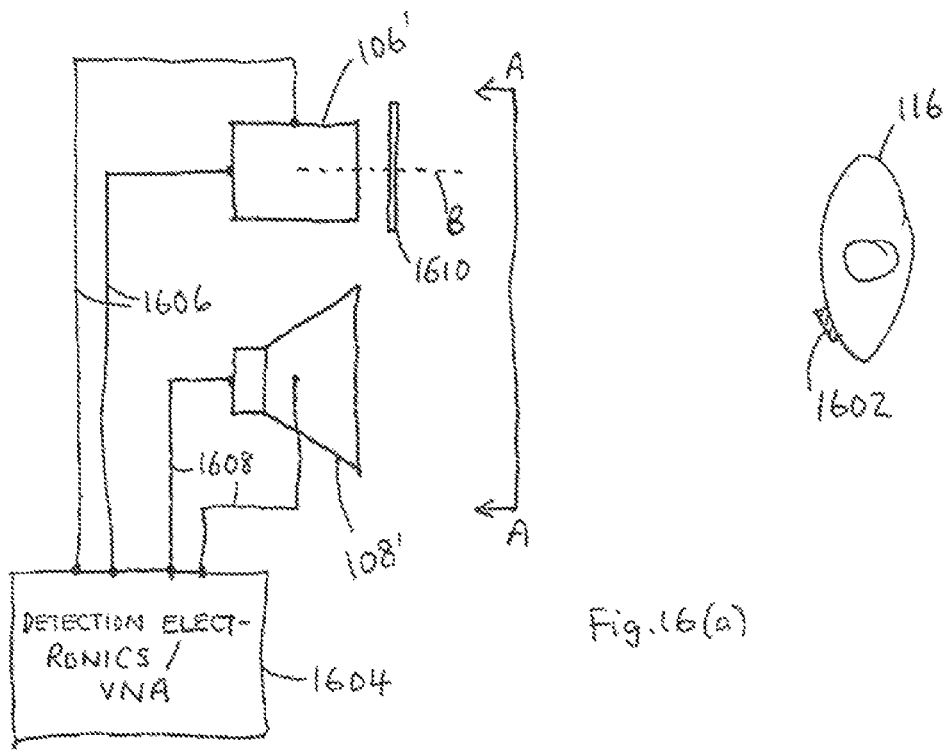
FIG. 16(a) shows the arrangement for detection of the Late Time Response according to a further embodiment of the invention in plan view and in FIG. 16(b) as viewed from A-A.
Figure 16B:
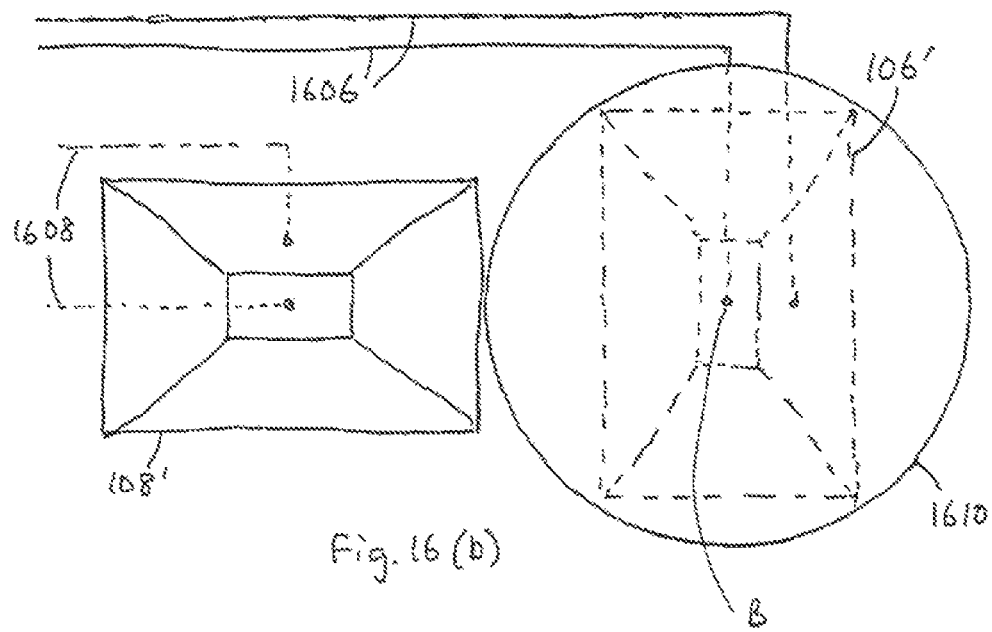

FIG. 16 shows the arrangement for detection using LTRs, according to a further embodiment of the invention, (a) in plan view, and (b) as viewed at A-A in FIG. 16(*a*). A TX horn 106' and a RX horn 108' are mounted facing the space in which an entity or target (e.g. person) 116, here shown carrying a metal threat object 1602, stands or may pass, during scanning for threat objects. Preferably, TX horn 106', and RX horn 108', each comprise a dual polarised horn antenna.

The TX horn 106' is coupled to detection electronics 1604 via (coax) cables 1606, and RX horn 108' is coupled to detection electronics 1604 via (coax) cables 1608. The detection electronics 1604 may comprise the circuitry of FIG. 2(*a*), excluding the horns 106, 108 and may, to the extent required, including PCs, processing circuitry and software controlled devices, for implementing the scanning, detection and data analysis techniques according to this embodiment, as discussed earlier in relation to other embodiments.

In certain embodiments, the apparatus includes a linear polarising element 1610, mounted for rotation about axis B. In this way, the entity or target 116 is illuminated by electromagnetic field with rotating polarisation. The spinning linear polarising element 1610 is used in conjunction with a dual polarised horn antenna to produce broadband microwaves with polarisation which rotates (either elliptically or circularly, depending on the relative amplitudes of the dual microwave feed) at a frequency equal to that of the frequency of rotation of the linear polarising element 1610. This allows optimum coupling between the exciting wave and the target 116, since coupling is strongly dependent upon polarisation for a given target aspect. The receiver RX horn 108' is also a dual polarised antenna and data from both channels are used in processing, as discussed further hereinafter.

Figure 17:
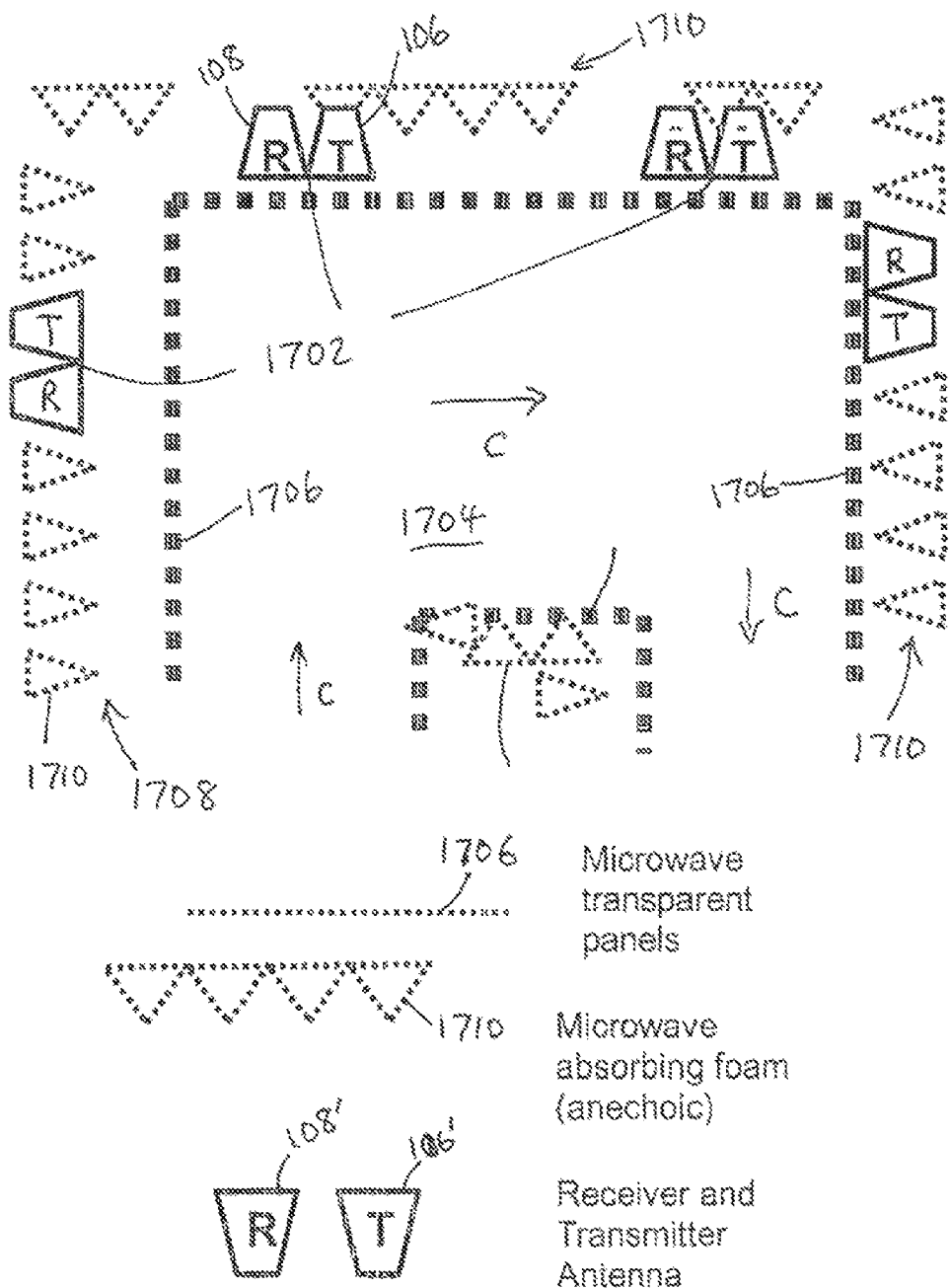
FIG. 17 shows a plan view for a detection system according to a further embodiment of the invention incorporating multiple transmitter and receiver pairs.

FIG. 17 is a plan view of a configuration for a detection system according to a further embodiment of the invention, incorporating multiple transmitter and receiver pairs 1702. Suitably, each transmitter and receiver pair 1702 comprises the TX horn 106' and a RX horn 108' of FIG. 16. In this case, four transmitter and receiver pairs 1702 are used, positioned in an anechoic lined corridor 1704 to give all round interrogation as the person walks through (in the path approximately indicated by arrows C). The use of multiple transmitter and receiving antennae pairs 1702 functions so as to give optimal coverage as the person (not shown) being interrogated passes through a corridor 704. These antennae pairs 1702 are concealed behind microwave transparent windows 1706 in walls 1708 rendered approximately anechoic by use of microwave absorbing (barns 1710. The microwave receiver antenna is a dual polarised horn.

Theoretical Background.

When an object is illuminated by Electromagnetic (EM) waves the scattered waves in the time domain can be approximately represented by $$R(t) = I(t) \otimes h(t)$$

where R is the scattered signal, I is the incident signal, h is the "impulse response" of the target, and $\otimes$ represents the mathematical convolution operation.

If the incident signal is a sharp pulse approximating the delta function then the scattered (detected) signal approaches $$R(t) = \delta(t) \otimes h(t) = h(t)$$

So the scattered signal approximates the impulse response of the object.

This is useful because the impulse response "carries" unique and aspect independent information about the electromagnetic response of the target.

$$h(t) = \sum_{m=1}^{\infty} A_m \cos(2\pi v_m t + \varphi_m) \exp(-\alpha_m t)$$

Amplitude (Aspect Dependent) — Frequency (Aspect Independent) — Damping (Aspect Independent) — Phase (Aspect Dependent)

Rewriting the late time response in exponential form we obtain $$h(t) = \sum_{m=1}^{\infty} C_m \exp((-\alpha_m + i2\pi v_m)t) + C_m^* \exp((-\alpha_m - i2\pi v_m)t)$$

where the argument of the exponential terms are the complex natural resonances of the target—these are aspect independent.

According to some embodiments of the invention, the Late Time Response (LTR) of the target 116 is recorded and Generalised Pencil Of Functions (GPOF) method is used to determine the complex natural resonances (poles)—

$$-\alpha_m + i2\pi v_m$$

These resonances or poles are used to identify the presence of a particular (threat) object by comparing the poles of with those of measured objects and looking for a correlation.

Requirements

Amplitude and phase detection—not just power detection (e.g. use VNA)

Ultra wide band (UWB) frequency to give sufficient time resolution to be able determine the frequency and decay tunes from the LTR.

$$\Delta t = \frac{1}{v_H - v_L}$$

Where the microwave frequency is scanned from a lowest frequency to $v_L$ through to a highest frequency $v_H$ In currently preferred embodiments of the system, this is 1/(17.5 GHz), i.e. 0.06 ns.

Brief outline of technique:
Detect scattered signals in both cross polarised and co-polarised orientation.
Subtract stable background and transform to time domain (DIFFT)
Time gate to isolate LTR and noise sample from signal
DFFT LTR and noise sample data and subtract
DIFFT to reconstruct "erase adjusted" LTR
Use Generalised Pencil Of Function or other method to obtain complex natural resonances and apply statistical analysis of multiple acquisitions LTR Detecton—Detailed Methodology Referring to FIG. 18(a), a typical response of human body with concealed handgun is shown. The two traces 1802, 1804 are for the two channels of the dual polarised TX horn 106' and RX horn 108' of FIG. 16. The early time response (ETR) and the late time (LTR) response are clearly distinguishable. The early time response is characterised by high frequency data while the low frequency oscillation after this is the late time response. The Late Time Response is aspect independent. In accordance with embodiments of the invention, the LTR must be separated from the ETR, as will be discussed further hereinafter.

This is further illustrated in FIGS. 18(b) and (c)—the former is for a person without a handgun, and the latter for a person carrying a concealed handgun.

Figure 19A:
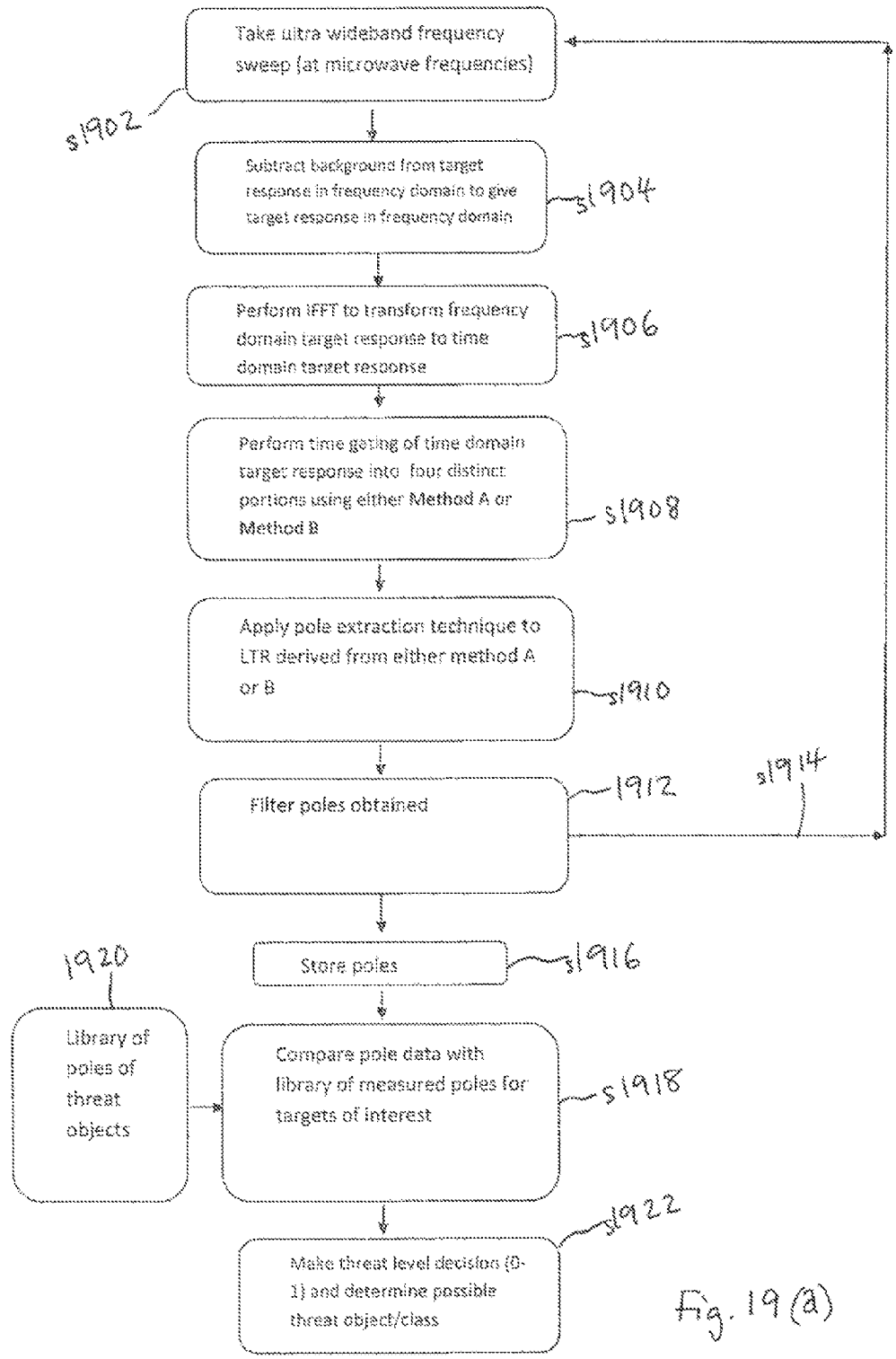
FIGS. 19(a) to 19(c) show the process of detecting objects using LTRs in accordance with embodiments of the invention.

FIGS. 19(a) to 10(c) show the process for detecting objects using LTRs, and in accordance with embodiments of the invention.

As seen in FIG. 19(a), in step s1902, an ultra wideband frequency sweep (at microwave frequencies) is taken, using the system of FIG. 16. Amplitude and phase data for scattered fields with (i) target and (ii) background (no target) are recorded in the frequency domain.

In step 1902, the Late Time Response of a metallic object 1602 (FIG. 16) on a target 116 is excited. The object may be a benign object, or may be a threat object such as a handgun or knife, concealed on the human body 116. Due to the different LTR responses of the objects, it is possible to determine whether a threat object is present—this is illustrated in FIG. 20(c). The handgun is a more complex object and clearly displays a superposition of damped resonances, compared with the simple objects of FIG. 20(a) (spanner/wrench) and FIG. 20(b) (Allen key).

The excitement of LTRs is achieved by illuminating the target 116 by a microwave source with frequency which is scanned from a lowest frequency $v_L$ through to a highest frequency $v_H$ to simulate illumination with a broadband (frequency content) and hence short time length, electromagnetic pulse. $v_L$ is typically (but is not restricted to) 0.5 GHz whereas $v_H$ is typically 18 GHz. The wavelength of the lowest frequency must exceed the size of the object 1602 in order to stimulate the fundamental mode (see further below).

The microwave output has variable (user determined) polarisation state which is obtained via—

(1a) Rotating a linear polarising filter 1610 immediately in front of the dual polarised microwave born 106' used for target illumination (FIG. 16). The dual polarised horn 106' gives microwave output with orthogonal linear polarisation state;

(1b) Introducing a time delay between the two input ports of the dual polarised microwave horn 106' used for target illumination in such a way as to give a time delay ¼v between the orthogonal polarised components, where v is the frequency of microwave output;

(2) Using a spiral free wave antenna (not shown) to give an elliptically polarised microwave output.

The polarised microwave source with frequency v is scanned from a lowest frequency $v_L$ through to a highest frequency $v_H$. The frequency bounds of the system are selected so that, the fundamental (lowest possible resonant frequency) and several higher order resonances of all threat objects 116 to be identified are encompassed within this range so that their excitation is possible. The natural resonant frequencies of objects 116 are related to the object's largest linear dimension in as much as the fundamental frequency is ~c/2l, where l is the object's largest linear dimension and c is the velocity of light in free space. The upper bound is determined only by the apparatus used and should be as high as is practicably achievable since it is the bandwidth of the system that determines the resolution of time data obtained.

The microwave receiving antennae 106', 108' (FIG. 16) are connected to a data capture device(s) (detection electronics 1604, such as a Vector Network Analyser (VNA); FIG. 16) that is capable of measuring the complex amplitude (containing the magnitude and phase information of the scattered microwave field) of the scattered electromagnetic return so that both amplitude and phase information can be utilised). The complex, frequency domain scattered signals of (in this case a human possibly carrying a concealed weapon) target and background (no target) are captured. Since the background is nominally constant this can be re-measured infrequently to ameliorate the effects of drift in the measuring equipment etc.

Returning to FIG. 19(*a*), subtraction (s1904) of the background response from the target response is carried out to give a complex, frequency domain signal which characterises the target only and is referred to as the target response.

The target response data is then subjected (step s1906) to Inverse Fast Fourier Transform (IFFT) to give the time domain, scattered signal, with a time resolution Δt given by $$\Delta t = \frac{1}{v_H - v_L}.$$

Figure 21:
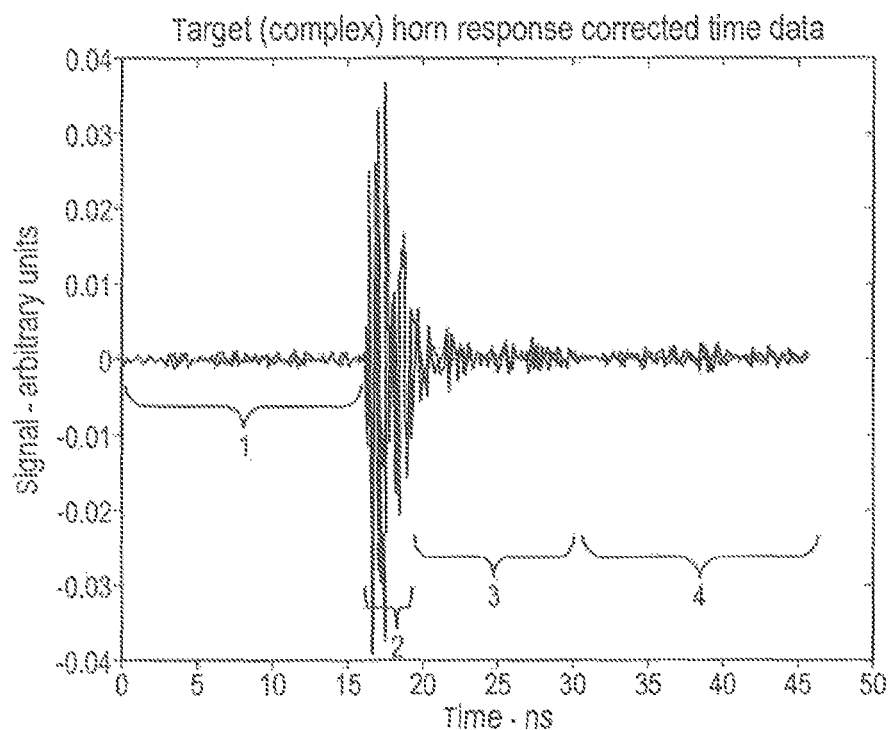
FIG. 21 illustrates the total time response for a Glock 17 handgun suspended in air, showing the LTR (3), to be separated from the other components of the signal.

The time domain signal so obtained is then time gated or "windowed" (step s1908) to divide the time signal into four distinct sections (see FIG. 21) which correspond to
1. The time period before the excitation
2. The time period during interaction with the propagating, exciting electromagnetic field
3. The time period immediately after excitation.
4. The time period after the LTR descends into the noise level FIG. 21 illustrates this separation, by showing the total time response for a Glock 17 handgun. The weapon is suspended in air.

This separation of the time response into sections is achieved by either of two techniques—Method A and Method B, as discussed further below.

Figure 19B:
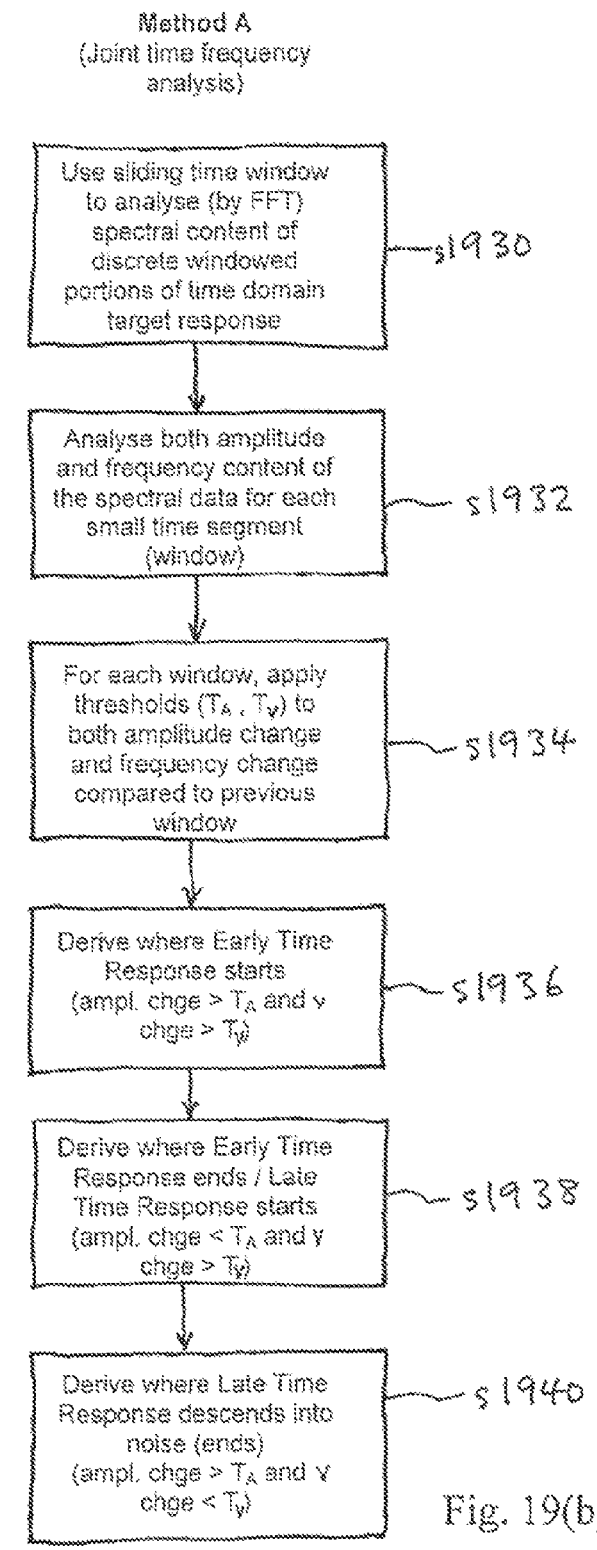
Figure 19C:
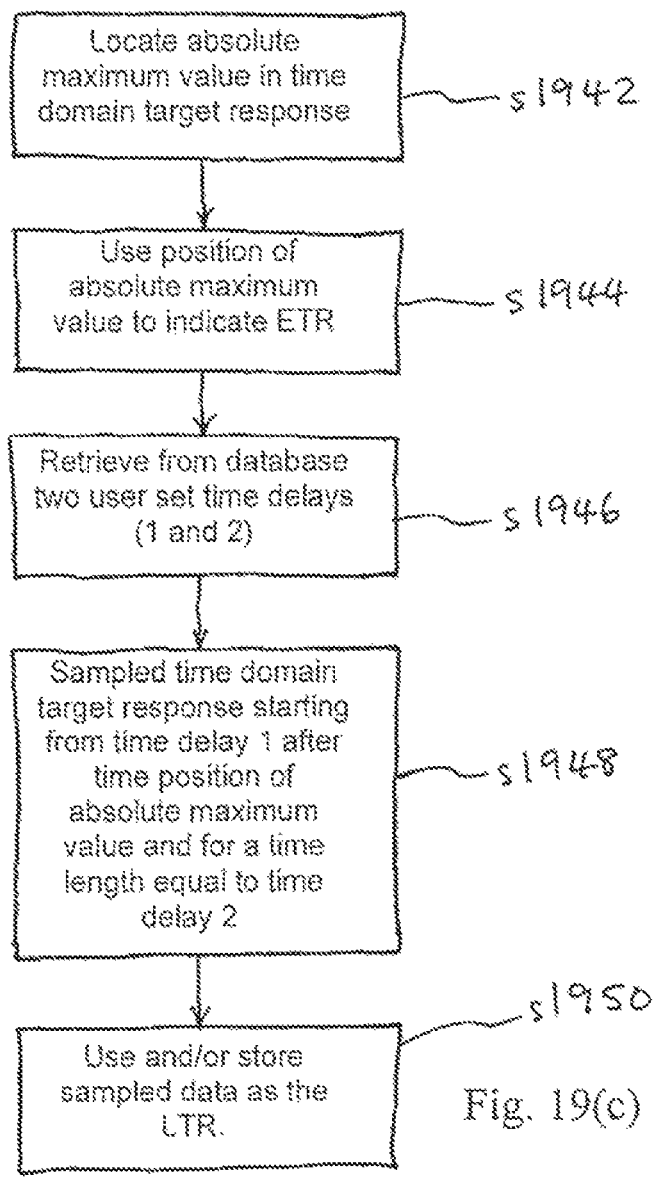

Method A is illustrated in more detail in FIG. 19(*b*). Here, sampling discrete, overlapping sections of the time response and applying a Fast Fourier Transform to each of these time samples. The frequency domain information thus obtained is used to identify the beginning and end of the early time response as this section contains large amplitude, higher frequency data and the start of the LTR, as this section contains lower amplitude lower frequency data (can we show this with a figure of sample output?). Finally, the position at which the LTR descends into the random noise level of the signal is identified by correlation with the portion 1.

First, at step s1930, a sliding time window is used to analyse (by FFT) spectral content of discrete windowed portions of time domain target response. The sliding windows have three user selected options—the segment size (time), the time shift applied to the window to "slide" it and whether the window is a step function or Gaussian in form. Typically both the window width and the time shin are <1 ns and exact values are empirically determined.

Next, at step s1932, both amplitude and frequency content of the spectral data (time domain target response) are analysed for each small time segment (window). This data is the used to determine where the Early Time Response starts and ends and where the Late Time Response starts and descends into noise (ends).

As seen in step s1934, for each window, thresholds ($T_A$, $T_v$) are applied to both amplitude (A) change and frequency (v) change compared to previous window. The ETR has large amplitude at high frequency whereas the LTR has large amplitude at lower frequency. The time periods before the ETR and after the LTR have low amplitude at all frequencies. The threshold for amplitude change and the threshold for frequency change are determined empirically by the user beforehand.

Thus at step s1936, the position where Early Time Response starts is derived from (ampl. chge>$T_A$ and v chge>$T_v$).

Next, at step s1938, the position where Early Time Response ends/Late Time Response starts is derived from (ampl. chge<$T_A$ and v chge>$T_v$).

Finally, at step s1940, the position where Late Time Response descends into noise (ends) is derived from (ampl. chge>$T_A$ and v chge<$T_v$).

Method B is illustrated in more detail in FIG. 19(*c*). This subprocess proceeds as follows.

First (step s1942, the absolute maximum value in time domain target response is located. The absolute maximum value is used to determine the position of the ETR (s1944)

This Method, used two time delays (1 and 2)—these may for example be retrieved from a database (s1946). Time delay 1 ($t_1$) is chosen so that ETR from a typical human body is removed. This is done by applying the formula $$t_1 = 2D/c,$$

where D is the width of a typical human body. Time delay 2 ($t_2$) is chosen so that a typical LTR response would have been attenuated into the noise level after this time, and is for example ~5 ns.

Next, the time domain target response is sampled (step s1948), starting from time delay 1 after time position of absolute maximum value and continuing for a time length equal to time delay 2. Finally, the sampled data is used and/or store as the LTR.

Once dm time gating (step s1908) has been performed, a pole extraction technique is applied to the derived LTR.

Referring briefly to FIG. 21, the latter portion (3) is the Late Time Response (LTR) and this complex data is defined as that immediately after the scattered response or Early Time Response (ETR). The LTR contains aspect independent information of conducting targets 116 carried on the body providing these conducting targets have natural resonance(s) which exist between the frequency bounds $v_L$ and $v_H$ with decay time(s) (lifetimes) chat are sufficiently long that there is discernible amplitude above noise after the ETR of the body has passed.

The LTR data S[n] is expected to be of the form $$S[n] = 1/2 \sum_{m=1}^{M} C_m \exp(Z_m n \Delta t) + 1/2 \sum_{m=1}^{M} C_m^* \exp(Z_m^* n \Delta t) + N[n]$$

Where there exist M natural resonances $Z_m$ between the frequencies $v_L$ and $v_H$ and there is assumed to be inherent noise in the system N The natural resonances or poles $Z_m = -\alpha_m + i2\pi v_m$ are aspect independent and are to be extracted in step s1910 as precisely as is possible in order to confirm the presence or absence of a particular threat object 1602 whose natural resonances are known (either by measurement or numerical simulation) a-priori. The complex amplitudes $C_m$ are highly aspect dependent and are not utilised explicitly in the determination of the presence or absence of a threat object.

Depending on the embodiment, the poles are extracted using either the Generalised Pencil Of Functions method (Matrix Pencil method) or a Genetic Algorithm is implemented for this purpose. The complex poles and their associated complex amplitudes (residues) are thus extracted. The Generalised Pencil Of Functions method is well known to persons skilled in the art, and will not be discussed in detail here, see "Generalized Pencil-of-Function Method for Extracting Poles of an EM System from Its Transient Response" Yingbo Hua and Tapa K. Sarkar, IEEE Transactions on Antennas and Propagation, Vol. 37, No. 2, February 1989.

Figure 22A:
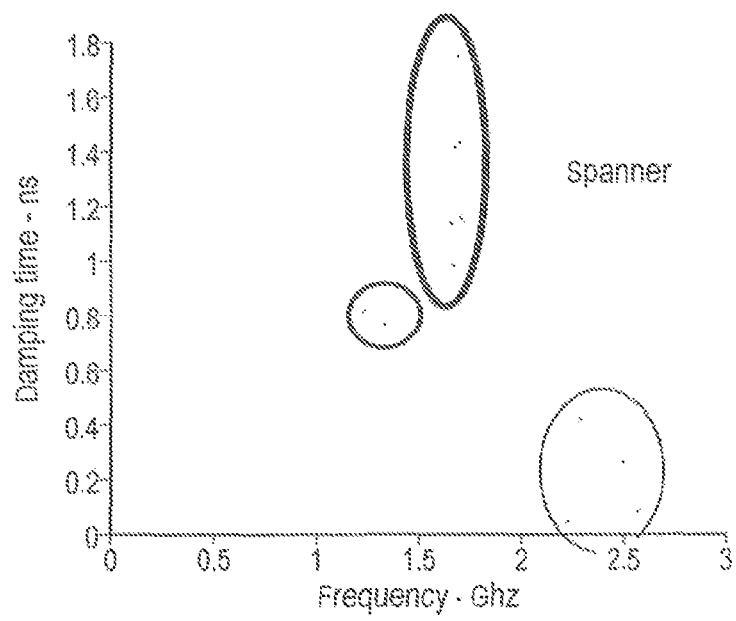
FIG. 22 illustrates poles extracted from LTR data using General Pencil of Functions method, for a spanner (FIG. 22(a)), an Allen key (FIG. 22(b)), and a handgun (FIG. 22(c)).
Figure 22B:
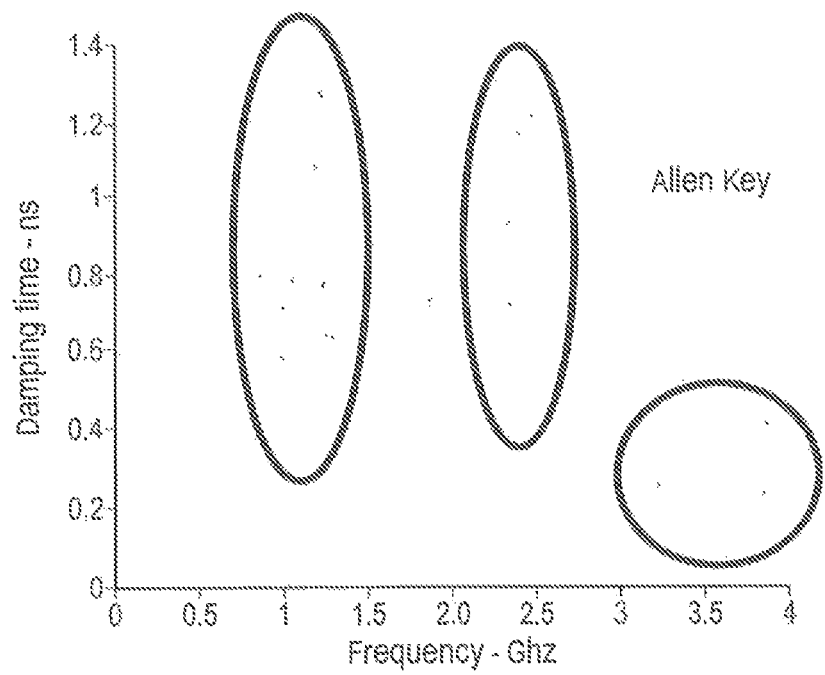
Figure 22C:
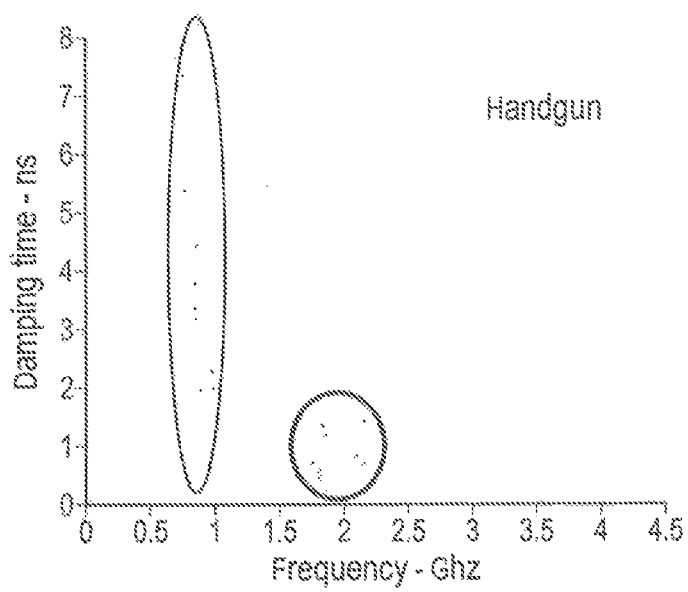

FIG. 22 illustrates poles extracted from LTR data using General Pencil of Functions method, varying model order from 1 to 10, for (a) a spanner, (b) an Allen key and (c), a handgun. It will be apparent that the position of the poles (circled) is different in each case. As the (approximate) position of poles for a number of threat objects is know, the determination based on the poles in FIG. 22(c) enables the presence of a weapon to be determined, as discussed below.

In an alternative embodiment, pole extraction (step s1910 in FIG. 19(a)) is performed using a Genetic Algorithm. For this case, and pseudocode for an exemplary algorithm, is provided in Appendix C.

A genetic algorithm and/or differential evolutionary algorithm is a well established method of obtaining the parameters necessary to find fee closest fit between the observed (experimental) Late Time Response (previously described as a sum of exponentially decaying sinusoidal functions or natural resonances) and the mathematical function that describes them, (given earlier) [In-Sik Choi et. al. "Natural Frequency Extraction Using Late-Time Evolutionary Programming-Based CLEAN", IEEE Transactions on Antennas and Propagation, Vol. 51, No. 12, December 2003]. In [In-Sik Choi et. al.] the decaying natural resonances functions are fitted one at a time to the late time response and then subtracted front the original data. This makes the differential evolution algorithm task somewhat easier as it limits the number of parameters to four, amplitude, phase and the real and imaginary parts of each pole $-\alpha_m + i2\pi v_m$ per iteration, ha a preferred embodiment, the maximum number of waveforms is fitted simultaneously, which is a more difficult task computationally as there are more permutations of possible solutions to explore. In a algorithm according to a preferred embodiment the crossover/mutation operator from differential evolution referred to in [Price and Storn 1997] is used, followed by a tournament selection [Price and Storn 1997] to find the fittest chromosomes, although this does not preclude other least squares minimisation methods. It has been found that this approach is able to successfully fit the 20 parameters necessary to describe 5 damped sinusoidal functions typically used when analysing responses from concealed guns and other weapons.

In order to determine the presence of a weapon, two of the four parameters for each damped sinusoid (frequency and decay) are stored. Typically a handgun will require at least two damped sinusoids to classify it. If multiple data sets are acquired then a cluster of frequencies and damping factors can be used to identify the weapon (see FIG. 22(c)). In order to classify the weapon at least two frequency/damping factor combinations can be used. Because the extracted parameters will never be exactly reproducible due to noise and other experimental artefacts, a clustering technique such as fuzzy c or k means clustering can be employed to find the centre of each cluster, or a self organising map type neural network will distribute neurons such that a particular set of neuron will be activated if a particular cluster pattern is presented to the network.

Returning to FIG. 19(a), following pole extraction (s1910), the poles are filtered (s1912). This means that poles are discarded if the magnitude of their amplitudes are smaller than a user set threshold or if the damping constants (real part of pole) are positive or if the frequency (imaginary part of pole) is negative. A user set maximum and minimum is also applied to both the damping and frequency parts of the pole. If the pole lies outside of this space then that pole is ignored. This discrimination space is selected from experimentally measured poles of likely threat objects, i.e. by measuring the poles of a selection of handguns on a body.

Steps 1902 to 11912 are repeated, as shown by loop s1914 a set number of times—decided by user set parameter. The number of loops is determined by the likely time a person being interrogated would spends within the active area (e.g. see corridor of FIG. 17) of the system, and this will depend on individual system configurations.

Next, following pole filtering (step s1912), the poles are stored S1916).

Then, at step s1918, the pole data is compared with library (1920) of measured poles for targets of interest, stored in a database.

The comparison is carried out by finding the closest matching library poles to those measured and then computing a root mean square error where the damping space and frequency space are weighted by experimentally determined values. This weighting is necessary as the pole position in damping space is more spread than in frequency space. The RMSE value is then compared to empirically determined threshold values to give a threat level based on the closeness of pole match.

Finally, it a threat level decision (0-1) is obtained and a possible threat object/class determined (s1922).

Embodiments of the invention include the following novel aspects and consequent advantages.

1. Ultra Wide Band (UWB) to give large frequency coverage and thus excite maximal number of resonances and to give high time resolution (short tune span) in LTR sufficient that rapidly oscillating and quickly decaying resonances can be captured,
2. Robust auto separation of the early and late time domains—giving the LTR for pole extraction, partly facilitated by the use of Ultra Wide Band excitation to make the boundary more obvious.
3. Anechoic portal design to give low noise response data.
4. Multiple pairs of transmitter/receiver antennae for all round target interrogation.
5. Continuous or stepped, scanned polarisation state through mechanical or phase generated elliptical polarised output to optimise possibilities of coupling into aspect independent modes.
   (i) A type of Genetic Algorithm known as an Evolutionary program for processing multiple sweeps of LTR data and simultaneously extracting the complex natural resonance poles for target identification, forming clusters of poles. The use of Evolutionary programming does not preclude the use of more conventional techniques such as Pencil of Function methods.
   (ii) Cross polarised transmission and receiving antennae to give enhance discrimination between body ETR and LTR.
   (iii) The pre-excitation time domain data can be used as a measure of dm effectiveness of the background subtraction, since if there are no scattering surfaces present between transmitter and target this data should be of very small amplitude relative to the other portions. The Fast Fourier Transform of the pre-excitation time portion can be used to improve the LTR data, by subtraction in the frequency domain and subsequent time domain reconstruction.

(iv) Undesirable effects of non-uniform transmitting and receiving antenna response cat) be mitigated by division of the frequency domain target response by the absolute value of the measured horn response in the frequency domain.

(v) Multiple transmitter/receiver pairs to give all round target coverage.

APPENDICES

Appendix A

Procedure for Collection and Automatic Analysis of Threat Object Sensor
Receive activation signal (e.g. operator activates scan button or subject triggers scan]
For a predetermined number of sweeps do
   While full frequency range not scanned do
   Illuminate subject with radiation
   Step over frequency range
   Receive reflected radiation signals
   Perform transformation on received radiation signals to produce time domain or optical depth domain trace
   Store in a sweep channel
End While
   Increment sweep channel
End do
Normalise time domain trace according to range
Use Complex Fourier Transform (VNA mode) or Direct Fourier Transform (reflectometry mode) to convert to x-dimension to determine position of trace peaks. From x-positions, use conversion factor $$L = \frac{c}{2\Delta f}$$

to determine corrected x-axis (optical depth).
+-+-+-+-+-+-+-+-+-+-+-+-+-+-+-+-+-+-+
Perform transformation on received radiation signals by all the steps below:

Appendix B.1

[pseudocode for transformation for Swept reflectrometry]
If (Technique1 (Swept reflectometry)) then
Use Direct Fourier Transformed signals (fft of $|E_R|^2$)
For each sweep channel do
   Set Lower and Upper bands L1 L2 for useful optical depths (e.g. 10 mm to 150 mm depending on weapon size and orientation).
   Set Threshold for useful signal level above previously collected values for body alone.
   From L1 to L2 do
      Store Signal above Threshold separately in vectors in array1
      Integrate Signals above threshold
   End do
End do
For each sweep channel do
   Correlate adjacent vectors and produce output1
   Sum with previous output1's
   Sum integrated signals above threshold
End do
Output1 is sum of ail correlations between vectors in array1
Output2 is sum of integrated signals above threshold for each sweep channel
Output3 will be different for gun when optical depths change as subject moves in beam than for block of explosive stimulant which is of a similar thickness from different aspects.
Output1 and Output2 are taken to Neural Network input (see FIG. 15).

+-+-+-+-+-+-+-+-+-+-+-+-+-+-+-+-+-+-+

Appendix B.2

Else If (Technique2 (Barrel tone detection)) then
[pseudocode for transformation for Barrel tone detection]
Use Direct Untransformed signals $|E_R|^2$
For each sweep channel do
   For set of weapon calibers do
      For set of barrel lengths do
         Calculate onset (f0) for caliber
         Calculate chirped response for Length L
         Correlate ideal response $\cos(2\pi(f^2-f_0^2)^{1/2}(2L/c)+\phi)$ with data.
         Store Correlation value
      End do
   End do
   Find best (lowest) correlation value and store in Output3
End do
Keep f0 and L and display
Output3 goes to Neural network (see FIG. 15).

+-+-+-+-+-+-+-+-+-+-+-+-+-+-+-+-+-+-+

Appendix B.3

Else if (Technique3 (Cross-polarisation detection)) then
[pseudocode for transformation for Cross-polarisation detection]
Use Complex Fourier Transform signals ($E_R$) which give range information, from normal and cross polarized detectors
Select Distance1 which is first significant reflection above a threshold (or which is given by an independent range finding sensor)
For each sweep channel do
   Apply a distance window of a given number of millimeters determined by database of responses horn weapons.
   Select trailing edge of response (distance2) by adjusting distance window to when response falls below threshold
   Integrate response from non-pol detector within window
   Integrate response from cross-pol detector within window
   Sum to previous integrations
   Correlate response from non-pol detector with cross-pot
   Store and sum correlation
End do Outputs 4 and 5 are sum of correlations and sum of integrations
Outputs are taken to Neural Network inputs (see FIG. 15).

++++++++++++++++++++

Appendix B.4

Else If (Technique4 (Late time response detection and resonant frequency detection)) then
[pseudocode for transformation for Late time response]
Use Complex Fourier Transform signals ($E_R$) which give range information, from normal and cross polarized detectors
For each sweep channel do
   Select Distance2 which is the output of Technique3
   Apply a distance window of a given number of millimeters determined by database of late time responses from weapons.
   Find the smoothed responses of the late time responses (see FIG. 14) in normal and cross-pol detectors.
   Ascertain the exponential decay rate by a non-linear least squares fitting procedure. Output is stored in a vector
End do
Normalise outputs from the vector and form Output 6
Use Complex Fourier transformed signals ($E_R$), from normal and cross polarized detectors
For each sweep channel do
   For the entire sweep data
   If response level above a normalised threshold then
   Apply series of non-linear filters (e.g. MUSIC filter) with filter characteristics taken from a data base to look for a particular resonance
   Store the magnitude of the resonance
   Apply a peak detection algorithm (E.G. zero crossing)
   Store peak locations
   End If
End do
For each sweep channel do
   Compare peak locations with known natural resonances for object
   Sum the differences between peak locations and natural resonances from data base.
   Output7 is sum of differences—to Neural Network.
   Keep the peak locations for display, which can indicate weapon type.
End do
End If//End of transformation techniques phase

++++++++++++++++++++

Appendix C

Task for Differential Evolutionary Program
   To minimise the sum of squares error (SSE) between the observed and calculated late time response (LTR), LTR generated from equation $$S[n] = 1/2 \sum_{m=1}^{M} C_m \exp(Z_m n \Delta t) + 1/2 \sum_{m=1}^{M} C_m^* \exp(Z_m^* n \Delta t)$$

given in text.

For this algorithm POLE indicates frequency, phase shift, decay rate and amplitude.
To choose the optimum number of poles by monitoring decrease in SSE after each increase in the number of poles
To obtain the optimum LTR data by a SIMULTANEOUS fit of multiple poles unlike the technique of Choi [1] et al who find optimum parameters for a SINGLE pole and then extract this from the original data set ITERATIVELY until the desired number of poles is obtained. No criteria are givers for the termination of the iteration.
Algorithm
LOOP L from MINPOLES to MAXPOLES[S]
   LOOP K from 1 to MAXIMUM NUMBER OP GENERATIONS
   Create initial random population of solutions
   LOOP M from 1 to SIZE OF RANDOM POPULATION
     Calculate observed LTR with L poles according to $M^{th}$ population data
     Perform SSE error calculation
     Store Mth SSE error
   END of loop M
   Store minimum SSE error and associated gene
   Mutate gene pool according to Ref. [2]
   END OF LOOP K
END OF LOOP L
   [S]Note: MINPOLES typically 2 and MAXPOLES typically 5
   NEGLECT POLES WITH VERY SMALL AMPLITUDE
   NEGLECT POLES WHEN SSE STILL IMPROVING ACCORDING TO A USER DEFINED TOLERANCE
   STORE OPTIMUM FREQUENCY AND DECAY RATE
   Don't store AMPLITUDE AND PHASE—not used for eventual weapons classification.

REFERENCES

[1] Natural Frequency Extraction Using Late-Time Evolutionary Programming-Based CLEAN, In-Sik Choi, Joon-Ho Lee, Hyo-Tae Kim, and Edward J. Rothwell IEEE TRANSACTIONS ON ANTENNAS AND PROPAGATION, VOL. 51, NO. 12, DECEMBER 2003
[2] Price and Storn 1997 [Journal of Global Optimisation 11, 351-359]

The invention claimed is:
1. An apparatus comprising:
a transmitter configured to transmit at least one of microwave and millimeter wave radiation varied over a range of frequencies;
a detector configured to receive radiation resulting from the transmitted radiation to enable production of a frequency-dependent detection signal; and
a controller configured to detect an object upon which the transmitted radiation is incident based at least on an oscillatory term in the detection signal indicative of a dimension of the object.
2. An apparatus according to claim 1, wherein the controller is configured to determine the oscillatory term by at least performing spectral analysis of the detection signal.
3. An apparatus according to claim 2, where the controller is configured to determine the oscillatory term by determining a position of a feature in a transformed signal obtained by at least performing a Fourier-type transform of the detection signal.
4. An apparatus according to claim 3, wherein the controller is configured to reduce an amount of data to be processed by at least disregarding a part of the transformed signal corresponding to dimensions outside a range of interest.

5. An apparatus according to claim 1, further comprising a range finder and wherein the controller is configured to use a range of the object as a normalization factor when detecting the object.

6. An apparatus according to claim 1, wherein the controller is configured to detect the object based on a plurality of oscillatory terms in the detection signal indicative of a plurality of dimensions of the object, respectively.

7. An apparatus according to claim 1, wherein the controller is configured to determine that the object is of a predetermined type based on data indicative of a set of dimensions associated with the predetermined type of object.

8. An apparatus according to claim 1, wherein the controller is configured to detect the object using a neural network, wherein data indicative of at least the dimension of the object is provided to the neural network.

9. An apparatus according to claim 1, wherein:
the transmitter is configured to repeatedly transmit the radiation; and
the controller is configured to detect the object using a plurality of frequency-dependent detection signals.

10. An apparatus according to claim 1, wherein:
the detector comprises a first detector configured to detect radiation with a first polarization state and a second detector configured to detect radiation with a second, different polarization state; and
the controller is configured to detect the object using at least a first detection signal associated with the first polarization state and a second detection signal associated with the second polarization state.

11. An apparatus according to claim 1, wherein the detector is configured to use direct detection without phase detection to produce the frequency-dependent detection signal.

12. An apparatus according to claim 1, wherein the controller is configured to detect the object based at least on an oscillatory term in the detection signal indicative of a dimension of the object with a resolution of 5-10 mm or higher.

13. A method comprising:
transmitting at least one of microwave and millimeter wave radiation varied over a range of frequencies;
receiving radiation resulting from the transmitted radiation to enable production of a frequency-dependent detection signal; and
detecting an object upon which the transmitted radiation is incident based at least on determining an oscillatory term in the detection signal indicative of a dimension of the object.

14. A method according to claim 13, further comprising detecting the object based at least on an oscillatory term in the detection signal indicative of a dimension of the object with a resolution of 5-10 mm or higher.

15. A method according to claim 13, further comprising using direct detection without phase detection to produce the frequency-dependent detection signal.

16. A method according to claim 13, wherein determining the oscillatory term comprises performing spectral analysis of the detection signal.

17. A method according to claim 16, wherein determining the oscillatory term further comprises determining a position of a feature in a transformed signal obtained by at least performing a Fourier-type transform of the detection signal.

18. A method according to claim 17, further comprising reducing an amount of data to be processed by at least disregarding a part of the transformed signal corresponding to dimensions outside a range of interest.

19. A method according to claim 13, further comprising finding a range of the object and using the range as a normalization factor when detecting the object.

20. A method according to claim 13, further comprising detecting the object based on a plurality of oscillatory terms in the detection signal indicative of a plurality of dimensions of the object, respectively.

21. A method according to claim 13, further comprising determining that the object is of a predetermined type based on data indicative of a set of dimensions associated with the predetermined type of object.

22. A method according to claim 13, further comprising detecting the object using a neural network, wherein data indicative of at least the dimension of the object is provided to the neural network.

23. A method according to claim 13, further comprising:
repeatedly transmitting the radiation; and
detecting the object using a plurality of frequency-dependent detection signals.

24. A method according to claim 13, further comprising:
detecting radiation with a first polarization state;
detecting radiation with a second, different polarization state; and
detecting the object using at least a first detection signal associated with the first polarization state and a second detection signal associated with the second polarization state.

* * * * *